(12) United States Patent
Pekoz et al.

(10) Patent No.: US 11,050,449 B1
(45) Date of Patent: Jun. 29, 2021

(54) SYSTEM AND METHOD FOR EXTENSIONLESS ADAPTIVE TRANSMITTER AND RECEIVER WINDOWING

(71) Applicant: University of South Florida, Tampa, FL (US)

(72) Inventors: Berker Pekoz, Tampa, FL (US); Selcuk Kose, Pittsford, NY (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/675,888

(22) Filed: Nov. 6, 2019

Related U.S. Application Data

(63) Continuation-in-part of application No. 16/223,198, filed on Dec. 18, 2018, now Pat. No. 10,511,338, which is a continuation of application No. 16/167,034, filed on Oct. 22, 2018, now abandoned.

(60) Provisional application No. 62/623,330, filed on Jan. 29, 2018, provisional application No. 62/609,866, filed on Dec. 22, 2017.

(51) Int. Cl.
| | |
|---|---|
| *H04B 1/10* | (2006.01) |
| *H04L 27/26* | (2006.01) |
| *H04B 17/336* | (2015.01) |
| *H04L 25/03* | (2006.01) |
| *H04L 5/00* | (2006.01) |

(52) U.S. Cl.
CPC ......... *H04B 1/1027* (2013.01); *H04B 1/1036* (2013.01); *H04B 17/336* (2015.01); *H04L 25/03834* (2013.01); *H04L 27/264* (2013.01); *H04L 27/2607* (2013.01); *H04L 27/2614* (2013.01); *H04L 27/2628* (2013.01); *H04B 2001/1045* (2013.01); *H04L 5/0007* (2013.01)

(58) Field of Classification Search
CPC ........... H04B 1/10; H04B 1/1027; H04B 1/12
USPC ........................................................ 375/346
See application file for complete search history.

(56) References Cited

U.S. PATENT DOCUMENTS

| | | | |
|---|---|---|---|
| 8,208,567 B2 | 6/2012 | Yeon et al. | |
| 8,509,324 B2 | 8/2013 | Kim et al. | |
| 8,571,136 B1 | 10/2013 | Mahmoud et al. | |
| 8,605,837 B2 | 12/2013 | Wiese et al. | |
| 10,873,972 B2 * | 12/2020 | Wang | H04L 5/0092 |

(Continued)

OTHER PUBLICATIONS

Ankarali et al., Static Cyclic Prefix Alignment for OFDM-Based Waveforms. Proc. 2016 IEEE Global Commun Conf. Workshops, Washington, DC, Dec. 1-6, 2016.

(Continued)

*Primary Examiner* — Shuwang Liu
*Assistant Examiner* — Gina M McKie
(74) *Attorney, Agent, or Firm* — Molly L. Sauter; Smith & Hopen, P.A.

(57) ABSTRACT

A system and method for frame structure compliant adaptive extensionless windowing that maximizes fair proportional network capacity in the download. Gains are provided by emulating the multipath multiple access channel to the base station to calculate almost-optimum transmitter windowing durations prior to transmission and using the variance of received symbols using different window durations to allow the user equipment nodes to estimate optimal receiver windowing durations without calculations requiring further knowledge about the network.

20 Claims, 15 Drawing Sheets

(56) References Cited

U.S. PATENT DOCUMENTS

| | | | | |
|---|---|---|---|---|
| 2005/0180533 A1* | 8/2005 | Hamman | ............ | H04L 27/2662 |
| | | | | 375/348 |
| 2007/0064824 A1* | 3/2007 | Wang | ................ | H04L 25/03006 |
| | | | | 375/260 |
| 2015/0341201 A1* | 11/2015 | Funada | ............... | H04W 52/281 |
| | | | | 375/260 |
| 2016/0294441 A1 | 10/2016 | Fazlollahi et al. | | |
| 2019/0357211 A1* | 11/2019 | Kim | ...................... | H04W 48/12 |

OTHER PUBLICATIONS

Tom et al., Suppressing Alignment: Joint PAPR and Out-of-Band Power Leakage Reduction for OFDM-Based Systems. IEEE Transactions on Communications. 2016. vol. 64 (No. 3): 1100-1109.

\* cited by examiner

SYSTEM AND METHOD FOR EXTENSIONLESS ADAPTIVE TRANSMITTER AND RECEIVER WINDOWING

CROSS-REFERENCE TO RELATED APPLICATIONS

This application is a Continuation-in-Part (CIP) of currently pending U.S. patent application Ser. No. 16/223,198 filed on Dec. 18, 2018, entitled "Network-Aware Adjacent Channel Interference Rejection and Out of Band Emission Suppression", which claims priority to U.S. patent application Ser. No. 16/167,034 filed on Oct. 22, 2018, entitled "Network-Aware Adjacent Channel Interference Rejection and Out of Band Emission Suppression" and to U.S. Provisional Patent Application No. 62/623,330 filed on Jan. 29, 2018, entitled "Network-Aware Adjacent Channel Interference Rejection and Out of Band Emission Suppression" and to U.S. Provisional Patent Application No. 62/609,866 filed on Dec. 22, 2017, entitled "Enhancing Performance of Beyond 5G Networks Through Adaptive Windowing and CP Alignment, all of which are incorporated by reference herein in their entirety.

GOVERNMENT SUPPORT STATEMENT

This invention was made with government support 1609581 awarded by the National Science Foundation. The Government has certain rights in the invention.

BACKGROUND OF THE INVENTION

Third Generation Partnership Project (3GPP) designed 4G Long Term Evolution (LTE) to deliver broadband services to the masses. The design was successful in doing what it promised, but the one-size-fits-all approach resulted in certain engineering trade-offs. The 4G broadband experience was possible at a certain reliability but does not allow for ultra-reliable and low-latency communications (uRLLC) operations, is not the most power-efficient design and is only possible below 120 km/h mobility.

The 5G new radio (NR) physical layer was designed to utilize the orthogonal frequency division multiplexing (OFDM) waveform with different parameters, referred to as numerologies, allowing prioritization of certain aspects in different applications and made the enhanced-mobile broadband (eMBB) experience possible in a wider range of scenarios. For example, while low power Internet of Things (IoT) devices are assigned smaller subcarrier spacings to conserve battery life, vehicular communications operate with higher subcarrier spacings and shorter symbol durations to keep the communication reliable in high Doppler spreads, resulting from the higher speeds.

This shift in paradigm brought with it a problem that had been deliberately avoided by the uniform design. Regardless of the domain in which multiple accessing (MA) was performed, the use of a unified orthogonal waveform in the point-to-multipoint downlink (DL) avoided the inter-user equipment (UE) interference problem experienced in the multipoint-to-point uplink (UL), in all preceding generations of cellular communications. However, by allowing the coexistence of different OFDM numerologies in adjacent bands, adjacent channel interference (ACI) between UEs sharing these bands arises in the downlink. In the uplink, although orthogonal waveforms were used in principle, power differences and timing and frequency offsets across UEs caused interference. Although they came at certain costs, strict timing and frequency synchronization across UEs and power control have been historically used to mitigate the interference in the uplink. Unfortunately, with the use of different numerologies, these remedies are not a solution to the problem and inter-numerology interference (INI) is inevitable, even in the downlink. 3GPP acknowledges this problem and gives manufacturers the freedom to implement any solution they choose, as long as they respect the standard frame structure.

Windowing of OFDM signals is a well-studied interference management technique that has garnered attention due to its low computational complexity. Windowing can be performed independently at the transmitter to reduce out-of-band (OOB) emission or can be performed at the receiver to reduce interference caused by communication taking place in adjacent channels, commonly referred to as ACI. Most recently, utilizing different window functions for each subcarrier at the transmitter and receiver has been proposed and the window functions for each subcarrier that maximizes the spectral localization and interference rejection have been derived.

However, in most of the preceding literature focusing on windowing, windowing was performed by extending the symbols by an amount which was arbitrarily chosen without explanation, in addition to standard cyclic prefix (CP) duration, as illustrated in FIG. 1B, and the focus was on deriving window functions optimized in an effort to maximize standard performance metrics. These extensions reduce the symbol rate and change the frame structure defined in the standard, thus creating nonstandard signals that are not orthogonal to the symbols that aim to share the same numerology. As mentioned above, this is not acceptable in the current cellular communication standards. Furthermore, extending the symbol duration relentlessly, causes the symbol duration to exceed the coherence time of the channel, which is a critical problem for high-speed vehicular communications. Attempts have been made to improve spectral efficiency of windowed OFDM systems by not applying windowing to the resource elements (REs) of inner subcarriers assigned to UEs experiencing long delay spreads and applying windowing on the edge subcarriers using the excess CP assigned to UEs experiencing long delay spreads and applying windowing on the edge subcarriers using the excess CP assigned to UEs experiencing short delay spreads. While effective, this scheme is only applicable if all UEs utilize the same numerology. Additionally, in the inventors' previous work, the first standard compliant windowing scheme was proposed, in which the receiver windowing durations were derived to optimize reception of each subcarrier in the case where intersymbol interference (ISI) and ACI occur simultaneously and pulse shapes of transmitters operating in adjacent bands cannot be controlled, in the absence of any extension designated for windowing. However, the determination of whether it is more beneficial to window a duration at the transmitter or at the receiver has not previously been addressed in the literature.

Accordingly, what is needed in the art is an improved system and method that optimizes the combination of transmitter windowing and receiver windowing to maximize the overall capacity of the communication network, while also taking into consideration that UEs may utilize different numerologies.

SUMMARY OF THE INVENTION

Newer cellular communication generations are planned to allow asynchronous transmission of multiple numerologies (waveforms with different parameters) in adjacent bands, creating unavoidable adjacent channel interference (ACI). Most prior works on windowing assume additional extensions reserved for windowing, which does not comply with current standards. Additionally, whether windowing should be applied at the transmitter or the receiver has not been previously questioned.

In various embodiments, the present invention proposes a method to estimate the transmitter windowing duration of each subcarrier and to estimate the receiver windowing duration of each resource block with an aim to improve fair proportional network throughput. While doing so, the available extension, as defined in the standard, is solely utilized along with the proposed standard compliant algorithms that also do not require any modifications on the counterparts or control signaling. In the following discussion, the relations between optimum window durations at either side as functions of the distance from the center of the occupied bandwidth, the excess signal-to-noise ratios (SNRs), the subcarrier spacings and the gains provided over previous similar techniques are numerically verified.

In various embodiments, the present invention provides capacity gains when transmitter and receiver windowing are utilized jointly and adaptively to minimize network interference and maximize network capacity.

In one embodiment, the present invention provides an adaptive windowing method for a cellular communication network. The method includes, determining a receiver windowing duration for receiving a plurality of subcarriers of an Orthogonal Frequency Division Multiplexed (OFDM) symbol at a receiver of each of a plurality of user equipment nodes of a cellular communication network, wherein the receiver windowing duration is determined based upon second order statistics of received symbols. The method further includes, determining a transmitter windowing duration for transmitting each of the subcarriers of the OFDM symbol to each of the plurality of user equipment nodes from a base station transmitter of the cellular communication network, wherein the transmitter windowing duration for each of the subcarriers is determined based upon a signal to interference plus noise ratio (SINR) of each of the plurality of user equipment nodes.

In various embodiments, the method of the present invention maximizes the fair proportional network capacity of the cellular communication network when downloading the subcarriers. Additionally, in the method of the present invention, the receiver windowing duration and determining the transmitter windowing duration do not add any additional extensions other than the cyclic prefix used in a standard frame structure of the subcarriers of the subcarriers.

In an additional embodiment, the present invention provides a system for adaptive windowing method in cellular communication networks. The system may include, a plurality of user equipment nodes operating in a cellular communication network, each of the plurality of user equipment nodes for determining a receiver windowing duration for receiving a plurality of subcarriers of an Orthogonal Frequency Division Multiplexed (OFDM) symbol at a receiver of the user equipment node, wherein the receiver windowing duration is determined based upon second order statistics of received symbols. The system may further include a base station coupled to the plurality of plurality of user equipment nodes, the base station configured for determining a transmitter windowing duration for downloading each of the subcarriers of the OFDM symbol to each of the plurality of user equipment nodes from the base station transmitter of the cellular communication network, wherein the transmitter windowing duration for each of the subcarriers is determined based upon a signal to interference plus noise ratio (SINR) of each of the plurality of user equipment nodes.

In another embodiment, the present invention provides one or more non-transitory computer-readable media having computer-executable instructions for performing a method of running a software program on a computing device, the computing device operating under an operating system, the method including issuing instructions from the software program comprising for determining a receiver windowing duration for receiving a plurality of subcarriers of an Orthogonal Frequency Division Multiplexed (OFDM) symbol at a receiver of each of a plurality of user equipment nodes of a cellular communication network, wherein the receiver windowing duration is determined based upon second order statistics of received symbols and for determining a transmitter windowing duration for downloading each of the subcarriers of the OFDM symbol to each of the plurality of user equipment nodes from a base station transmitter of the cellular communication network, wherein the transmitter windowing duration for each of the sub carriers is determined based upon a SINR of each of the plurality of user equipment nodes.

DETAILED DESCRIPTION OF THE INVENTION

In various embodiments, the present invention evaluates how network capacity can be further improved if the pulse shapes of the transmitted waveforms can be designed while also conserving the standard frame structure, that is, not adding any additional extensions other than CP, and using only the present CP for windowing. The present invention utilizes methods described in two independent algorithms which aim to determine the amount of windowing that should be applied at either the receiver and/or the transmitter side to maximize fair proportional network capacity.

Unlike the inventors' previous works, in which receiver windowing duration calculations require channel impulse response (CIR) knowledge, the determination of the proposed receiver windowing duration in an embodiment of the present invention is non-data aided and is solely based on the second order statistics obtained from a plurality of received subcarriers and received OFDM symbols. The proposed method significantly reduces the complexity and eases implementation of the receiver windowing. The proposed transmitter windowing duration calculation of the present invention aims to maximize the network spectral efficiency by assigning high transmit window durations only to resource elements (REs) with excess signal to interference plus noise ratio (SINR) that can withstand the ISI caused by windowing. This reduces the ACI in the system, with minimum impact to the REs applying windowing. A RE is the smallest defined unit which consists of one OFDM sub-carrier during one OFDM symbol interval. As such, neither of the proposed algorithms requires any control data transfer to other parties of the communication or changes to the other nodes, at any point. Additionally, the spectrotemporal correlation of all user's wireless propagation channels allows estimating the optimum transmitter and receiver window duration for an RE and using the same duration for an RB, wherein each RB includes a predetermined number of REs and the CP. This allows implementations of the proposed algorithms with reduced computational complexity.

Figure 1A:
FIG. 1A is a visual demonstration of the standard symbol structure wherein the rectangles are allotted times for the actual OFDM symbol and its CP, respectively.
Figure 1B:
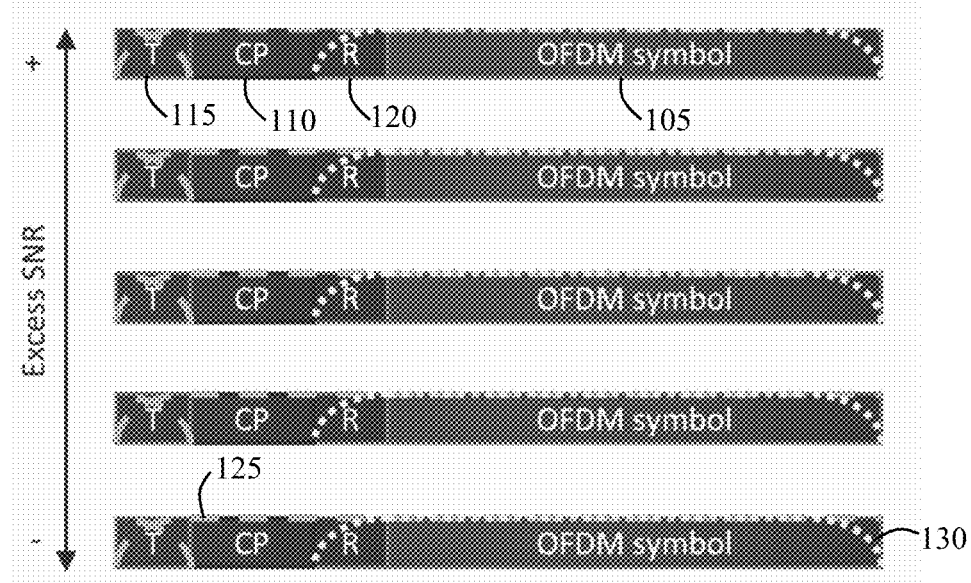
FIG. 1B is a visual demonstration of the symbol structure proposed by previous windowing schemes, wherein the rectangles are allotted times for the actual OFDM symbol, CP and further cyclic extensions for "T"ransmitter and "R"eceiver windowing, while the dashed line and the round dotted lines overlays demonstrate transmitter and receiver windowing of the underlying area, respectively.

FIG. 1A provides a visual demonstration of temporal standard symbol structure, wherein a CP extension 110 is added to an OFDM symbol 105 to implement windowing. The symbol structure proposed by previous windowing work is shown in FIG. 1B. As shown in FIG. 1B, the width of the rectangles represent allowed times for the actual OFDM symbol 105, CP 110, and further cyclic extensions for "T"ransmitter 115 and "R"eceiver windowing 120, while dashed overlays 125 and the round dot overlays 130 demonstrate transmitter and receiver windowing of the underlying area, respectively. Previous windowing techniques known in the art affix additional extensions, thus breaking the standard symbol structure, and they do not focus on the amount of these extensions and when they must be used.

Figure 1C:
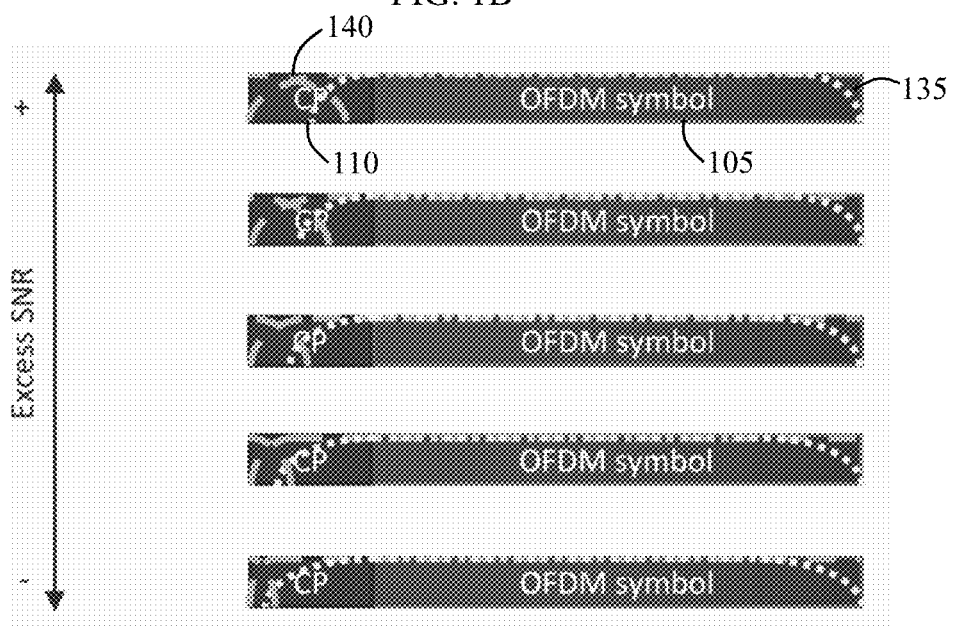
FIG. 1C is a visual demonstration of the adaptive CP concept in accordance with the present invention, wherein the rectangles are allotted times for the actual OFDM symbol, CP, while the dashed line and the round dotted lines overlays demonstrate transmitter and receiver windowing of the underlying area, respectively.

In contrast with FIG. 1A and FIG. 1B, the proposed adaptive utilization of the standard symbol structure using the readily available CP 110 for windowing of the OFDM symbol 105 in either side as a function of excess signal-to-noise ratio (SNR) is illustrated in FIG. 1C. As shown in FIG. 1C, the rectangles are allotted times for the actual OFDM symbol 105, CP 110 and the dashed overlays 135 and the round dot overlays 140 demonstrate transmitter and receiver windowing of the underlying area, respectively. Numerical results of the embodiments of the present invention confirm that fair proportional network spectral efficiency can be greatly increased without disrupting the standard frame structure by utilizing CP adaptively and determining transmitter windowing durations using excess SINR of REs and data-aided receiver windowing duration determination are an affective metric.

As shown with reference to FIG. 2A-FIG. 2D, at least a portion of the method of the present invention may be employed in a system comprising an OFDM transmitter 200 and/or an OFDM receiver 400.

Figure 2A:
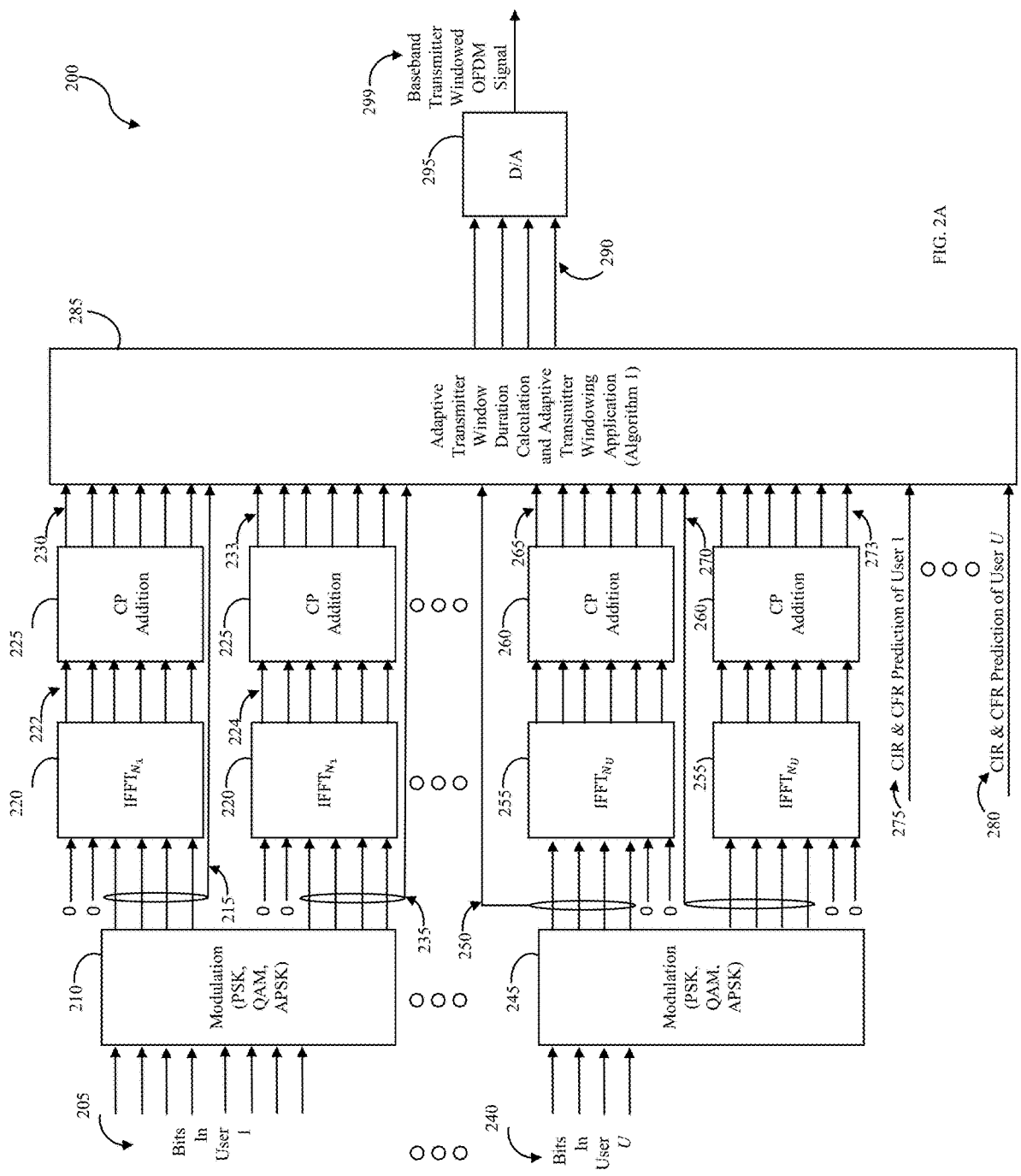
FIG. 2A is an illustration of at least a portion of a system of the present invention for employing the method of the present invention including an OFDM transmitter for adaptive transmitter windowing of the OFDM symbols, wherein the OFDM symbols include CP additions but no further extensions.

As shown with reference to FIG. 2A, the OFDM transmitter 200 includes a modulation module of user 1 210 configured to receive incoming data bits of user 1 205 and to generate digital modulated symbols comprising a plurality of symbols to be transmitted using a first OFDM symbol of user 1 215 and a second OFDM symbol of user 1 235. The OFDM transmitter 205 additionally includes an $N_1$-size Inverse Fast Fourier Transform (IFFT) module of user 1 220 to receive the plurality of modulated symbols 215, 235 from the modulation module of user 1 210. The IFFT module of user 1 220 receives incoming symbols for the first OFDM symbol of user 1 215 to generate a first OFDM-based signal of user 1 comprising a plurality of subcarriers 222, as well as symbols for the second OFDM symbol of user 1 235 to generate a second OFDM-based signal of user 1 comprising a plurality of subcarriers 224. The IFFT module 220 operates as a transmitter filter to filter the subcarriers of the OFDM-based signal to generate an OFDM-based signal. The first OFDM symbol of user 1 222 and the second OFDM symbol of user 1 224 are provided to the CP addition module 225 to generate a first CP-OFDM symbol of user 1 230 and a second CP-OFDM symbol of user 1 233. This process is repeated for a plurality of users up to user U, wherein the number of bits to be transmitted to user U 240 may be different than that of user 1 205, the modulation module 245 used to generate the modulated symbols of user U(250, 270 shown, others not shown) may employ a different modulation than that of user 1 210, the size of the IFFT operation module of user U 255 may be different than the size of the IFFT operation module of user 1 220, the length of the CP added by the CP addition module of user U 260 may be different than the length of the CP added by the CP addition module of user 1 225, and the number of CP-OFDM symbols for user U (265, 273 shown, others not shown) may be different than those of user 1, as is commonly known in the art. The channel impulse response (CIR) & channel frequency response (CFR) predictions of user 1 275 up to user U 280 are also generated as known in the art and provided to the adaptive transmitter window duration calculation and adaptive transmitter windowing application module 285.

Figure 2B:
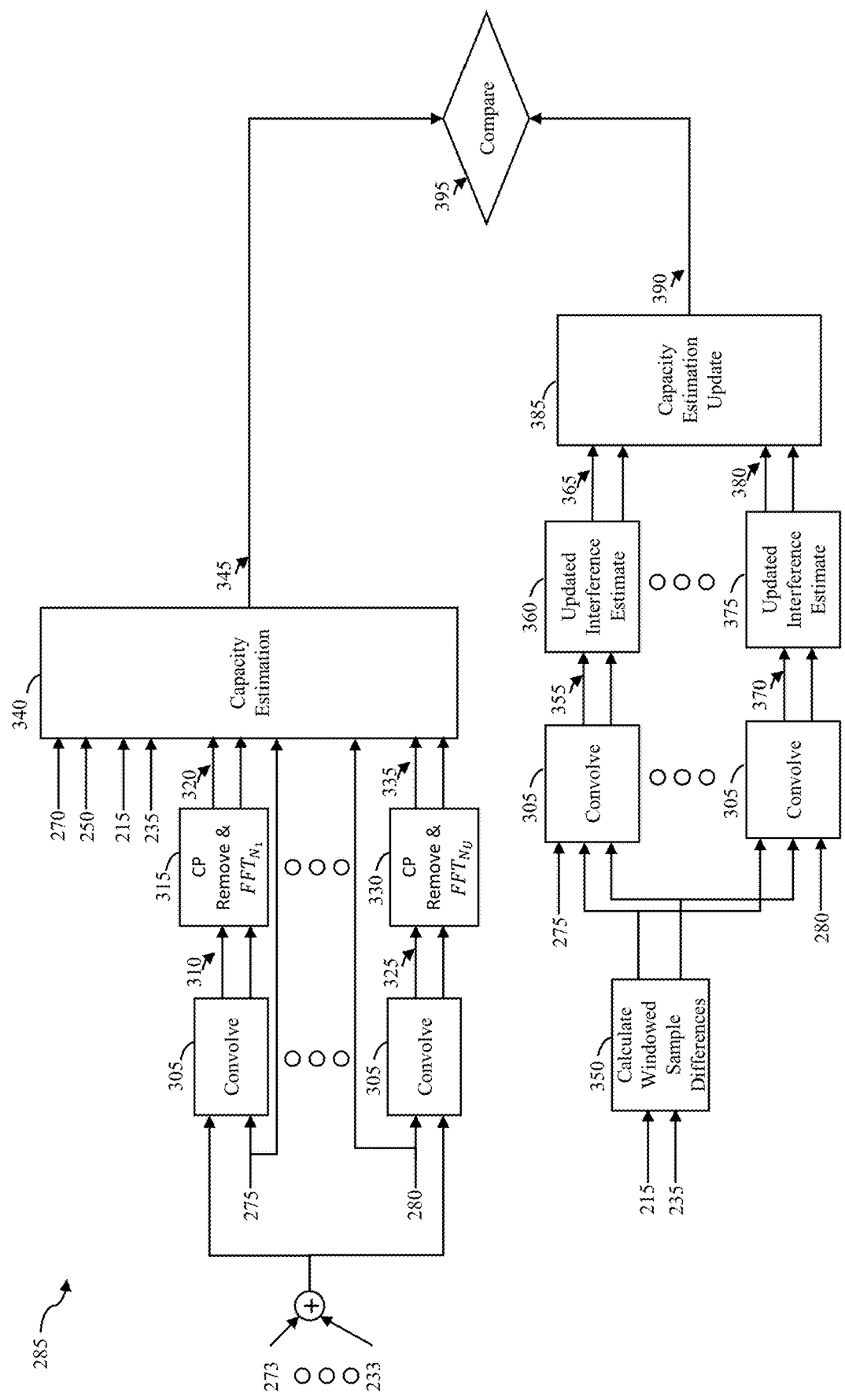
FIG. 2B is an illustration of at least a portion of a system of the present invention for employing the method of the present invention including an adaptive transmitter window duration calculation and adaptive transmitter windowing application.

In addition, as shown with reference to FIG. 2B, the adaptive transmitter window duration calculation and adaptive transmitter windowing application module 285 convolves 305 the sum of samples of all CP-OFDM symbols of all users 233, 273 (230, 265, and other additional elements not shown) with all user CIR predictions to estimate the samples to be received at a user 1 310 up to user U 325. These samples 310, 325 are conveyed to the respective receiver processing emulations, namely, samples to be received by user 1 310 have the CPs removed and FFTs taken 315 according to user 1's signal structure to obtain modulated symbols received by user 1 320, while samples to be received by user U 325 have the CPs removed and FFTs taken 330 according to user U's signal structure to obtain modulated symbols received by user U 335. The received symbol estimates 320, 335, CFR predictions 275, 280 and original information symbols 215, 235, 250, 270 of all users are fed to the capacity estimation module 340 to estimate the non-windowed capacity of the network 340, as described in detail below. The information symbols of the first OFDM symbol of user 1 215 and the information symbols of the second OFDM symbol of user 2 235 are also used to calculate windowed sample differences 350 in accordance with an embodiment with the invention to test a transmitter window duration. The sample differences are convolved with the CIR prediction of user 1 275 up to user U 280 to emulate the sample differences received at user 1 355 up to user U 370. These received sample differences are used to update the effective interference estimates at the receiver processing by user 1 360 to estimate the interference differences at user 1 365 up to the receiver processing by user U 375 to estimate the interference differences at user U 380. The updated interference estimates are supplied to the capacity estimation update 385 module to estimate the capacity changes of the network by the tested windowing 390. The windowed capacity under test 390 and the non-windowed capacity estimate 345 are compared 395 to determine the benefit of windowing. After the plurality of REs of the plurality of users are tested for a plurality of window durations, of which order and tested durations are described in detail later but not shown, the optimum window duration estimate of each RE of each user is estimated and the windowed sample differences calculated by the windowed sample difference calculator 350 for the optimum durations are added to the CP-OFDM symbols of all users to obtain the adaptive transmitter windowed OFDM-based signal 290, shown in FIG. 2A.

Figure 2C:
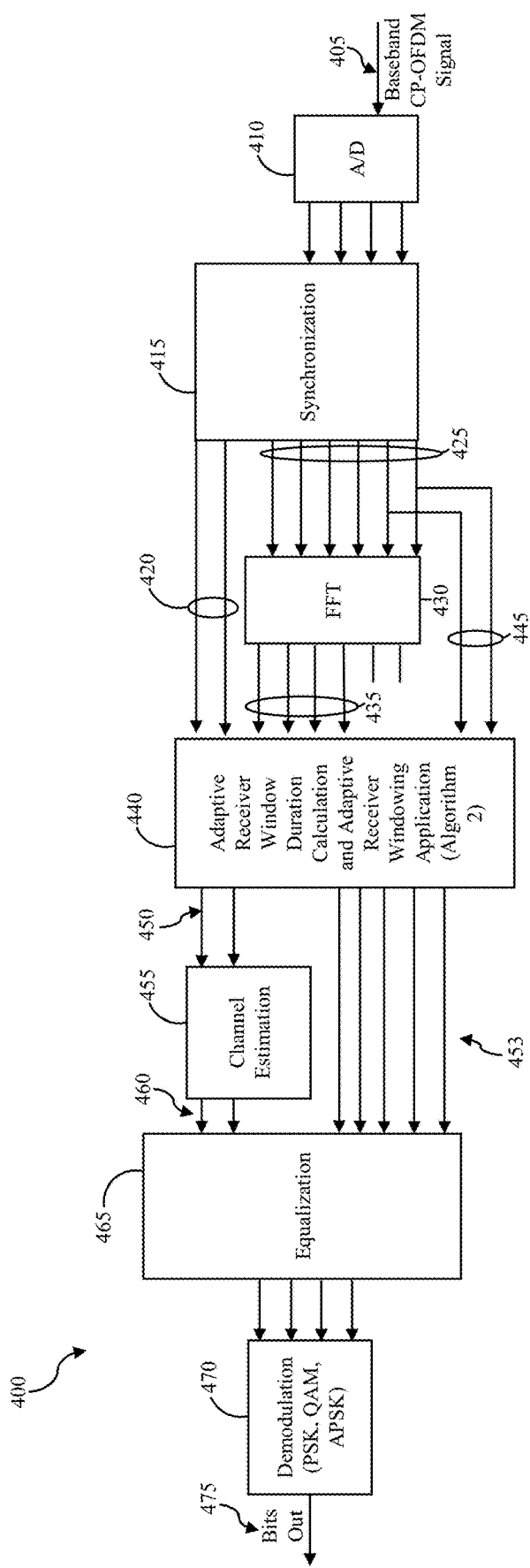
FIG. 2C is an illustration of at least a portion of a system of the present invention for employing the method of the present invention including an OFDM receiver for adaptive receiver windowing of the received OFDM symbols, wherein the OFDM symbols include CP additions but no further extensions.

In reference again to FIG. 2A, the adaptive transmitter windowed OFDM-based signal 290 is then provided to a digital-to-analog module 295 of the transmitter prior to transmission of the transmitter windowed OFDM-based signal 299 over the channel to a receiver 400 (shown in FIG. 2C).

In addition, as shown with reference to FIG. 2C, each OFDM receiver 400 includes an analog-to-digital module 410 configured to receive incoming OFDM-based signals 405 comprising a plurality of subcarriers that has been transmitted over the channel from the base station. The analog-to-digital module 410 provides the digital representation of the OFDM-based signals to a synchronization module 415 to locate the CP portions 420 and the OFDM symbol portions 425 of the received CP-OFDM based signals. The OFDM symbol portions 425 are provided to the Fast Fourier Transform (FFT) module, operating as a receiver filter 430 to filter the subcarriers of the OFDM-based signal. The processed REs that carry the symbols transmitted to the user 435 are then passed on to the adaptive receiver window duration calculation and adaptive receiver windowing application module 440 along with the CP samples 420 and the last samples of the OFDM portions 445, wherein the number of last samples of the OFDM portion 445 passed to the adaptive receiver window duration calculation and adaptive receiver windowing application module 440 is equal to the number of CP samples 420.

Figure 2D:
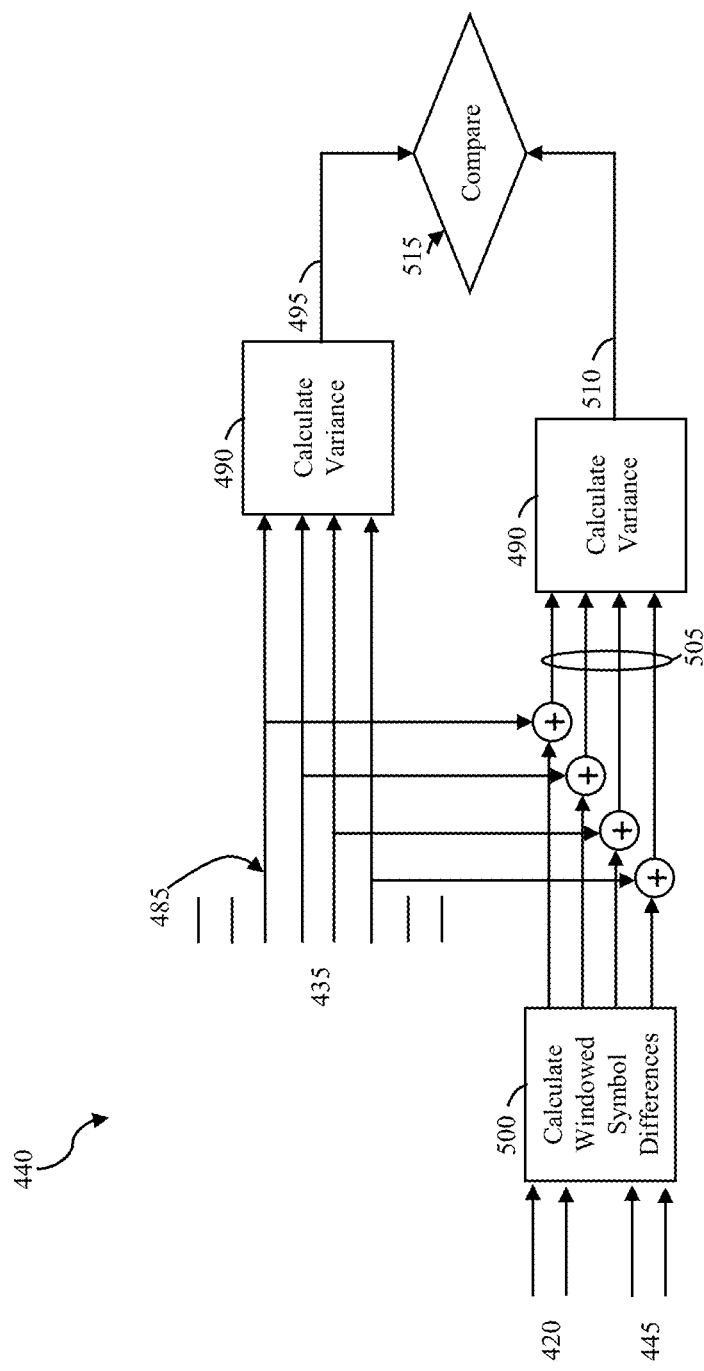
FIG. 2D is an illustration of at least a portion of a system of the present invention for employing the method of the present invention including an adaptive receiver window duration calculation and adaptive receiver windowing application.

In addition, as shown with reference to FIG. 2D, the adaptive receiver window duration calculation and adaptive receiver windowing application module 440 provides a portion 485 of the symbols transmitted to the user 435 to the variance calculation module 490, wherein the portion of symbols 485 are selected based on the expectation of experienced CFR and interference similarity to an RE in interest calculated using techniques known in the art (not shown). The CP samples 420 and the last samples of the OFDM portions 445 are provided to the receiver windowed symbol difference calculation module 500 to calculate the windowed symbol differences for the selected neighbors of the RE in interest 485. The receiver windowed symbol differences are added to the symbols 485 to obtain the plurality of receiver windowed symbols 505 for the selected neighbors of the RE in interest 485. The receiver windowed symbols 505 are provided to the variance calculation module 490 to calculate the variance of the receiver windowed symbols 510. The variance of the nonwindowed symbols 495 and the receiver windowed symbols 510 for plurality of window durations (not shown) are compared 515 and the symbol of the RE in interest having the receiver window duration that minimizes the variance is chosen for the symbol estimate for that RE (not shown). Again, in reference to FIG. 2C, the optimum adaptive receiver windowed pilot symbols 450 are provided to the channel estimation module 455 to obtain the channel estimates 460, which are provided to the equalization module 465 along with the optimum adaptive receiver windowed data symbols 453. The equalization module 465 provides the equalized symbols to the demodulation module 470 which determines the output bits 475.

In the following discussion, $(\bullet)^T$, $(\bullet)^*$ and $(\bullet)^H$ denote the transpose, conjugate and Hermitian operations, $A[a, b]$ is the element in the ath row and bth column of matrix A, $A[a,:]$ and $A[:,b]$ are each row and column vectors containing the ath row and bth column of matrix A, respectively, $\text{vec}(A) = [A[:,1]^T A[:,2]^T \ldots]^T$ is the vectorization operator, $A \odot B$ and $A \oslash B$ correspond to Hadamard multiplication and division of matrices A and B and A by B, $O_{A \times B}$ denotes matrices or zeros and ones with A rows and B columns, $\mathcal{CN}(\mu, \sigma^2)$ represents complex Gaussian random vectors with mean $\mu$ and variance $\sigma^2$, $\lceil X \rceil$ correspond to rounding all elements of X to the nearest integer, #$\mathbb{S}$ denotes the cardinality of set $\mathbb{S}$, $E_x[y]$ is the expected value of random vector y with respect to variable x and $j=\sqrt{-1}$.

In the present invention, it is assumed that there is a node, referred to as the gNB, that conveys information to all other nodes in the system and all other nodes aim to convey information solely to the gNB during processes referred to as download (DL) and upload (UL), respectively. There are U nodes other than the gNB, hereinafter referred to as UEs, sharing a total bandwidth B to communicate with the gNB using OFDM. Each UE u samples the entire band using an $N_a$-point Fast Fourier Transformation (FFT), such that the frequency spacing between the points at the FFT output becomes $\Delta f_u = B/N_u$. The quantity $\Delta f_u$ is referred to as the subcarrier spacing of user UE u. Bi-directional communication takes place is a time domain duplexing (TDD) fashion and frequency division multiple accessing (FDMA) is used for multiple accessing. UEs solely receive and do not transmit during gNB's transmission, i.e. DL, whereas all UEs transmit simultaneously in adjacent, but non-overlapping frequency bands in the UL. UL is assumed to take place before DL and is crucial to application of the invention, however this description is focused on modeling the details of the DL necessary for the proposed methods, for the sake of brevity, while necessary details regarding UL are provided in numerical verification. The data of each UE u is conveyed in $M_u$ consecutive subcarriers of $L_u$ consecutive OFDM symbols, with contiguous indices $\{M_{u,1}, \ldots, M_{u,M_u}\}$ out of the possible $N_u$, while the remaining subcarriers are left empty for use by other UEs. Although the algorithms presented and the performed analysis are directly compatible with orthogonal frequency division multiple accessing (OFDMA), for the sake of simplifying the notation throughout this work, pure FDMA is assumed, that is $L_{u_1}N_{u_1} = L_{u_2}N_{u_2}$, $\forall u_1, u_2 \in \mathbb{N}^*_{\leq U}$.

Symbols known by receiving nodes, commonly referred to as pilot or demodulation reference signals (DMRS), are transmitted in some REs (resource elements) for time synchronization and channel estimation purposes in both UL and DL. The DMRS transmitted to UE u are contained in the sparse matrix $P_u \in \mathbb{C}^{M_u \times L_u}$. The single carrier (SC) data symbols transmitted to UE u are contained in matrix $D_u \in \mathbb{C}^{M_u \times L_u}$, of which nonzero elements do not overlap with $P_u$.

A CP (cyclic prefix) of length $K_u$ samples is appended to each time domain OFDM symbol to mitigate multipath propagation and prevent ISI (intersymbol interference), wherein $K_u/L_u$ equals to the same constant for all UEs of the network and is referred to as the CP rate. The OFDM symbol samples, preceded by their respective CP samples, to be broadcasted to all users can be obtained as:

$$\check{x} = \sum_{u=1}^{U} vec\left(\begin{bmatrix} 0_{K_u \times (N_u - K_u)} & I_{K_u} \\ I_{N_u} & \end{bmatrix} F_{N_u} Q_u (P_u + D_u)\right), \quad (1)$$

where $\check{x} \in \mathbb{C}^{(N_u+K_u)L_u \times 1}, \forall u$ is the basic baseband sample sequence, $Q_u \in \mathbb{R}^{N_u \times M_u}$ is the resource mapping matrix of uth UE that maps the data elements to the scheduled resources, and $F_{N_u} \in \mathbb{C}^{N_u \times N_u}$ is the normalized $N_u$-point FFT matrix. Some CP samples may also be used for transmitter windowing to limit the OOB emission. Different transmitter window durations may be utilized for each RE to be transmitted to each UE. The transmitter window durations associated with uth UE's REs are given in $T_u \in \mathbb{N}_{\leq K_u}^{M_u \times L_u}$, which will be further described later in detail along with the application of per-RE transmitter windowing operation. Let $x = \mathbb{C}^{((K_u+N_u)L_u) \times 1}$ denote the per-RE transmitter windowed baseband sample sequence, calculated computationally efficiently as described later.

The waveform is then transmitted over the multiple access multipath channel. The complex channel gain of the cluster that arrives at the uth UE at the tth sample after a delay of $\tau$ samples is denoted by the complex coefficient $h_{u,\tau,t}$. It is assumed that these channel gains are normalized such that $$\mathbb{E}_t\left[\sum_{\tau=0}^{t-\Delta_{t,u}-1} |h_{u,\tau,t}|^2\right] = 1$$

and that they vary at each sample instant where the mobility of each UE is independent of all others. Then, the tth sample received at the uth UE is written as:

$$y_u[t] = \tilde{n} + \sqrt{\gamma_u} \sum_{\tau=0}^{t-\Delta_{t,u}-1} h_{u,\tau,t} x[t - \Delta_{t,u} - \tau], \, t \in \mathbb{N}^*, \quad (2)$$

where $x[t]:=0$, $\forall t \in \mathbb{N}_{>(K_u+N_u)L_u} \cup \mathbb{Z}^-$, $\tilde{n} \sim \mathcal{CN}(0,1)$ is the background additive white Gaussian noise (AWGN), $\gamma_u$ is the overall signal-to-noise ratio (SNR) of uth UE and $\Delta_{t,u}$ is the propagation delay for the uth UE in number of samples. Each UE then synchronizes to their signal by correlating the received samples with samples generated only using their $P_u$ and estimates $\hat{\Delta}_{t,u}$. The samples estimated to contain uth UE's lth OFDM symbol and its corresponding CP is denoted by vector $y_{l,u} \in \mathbb{C}^{(N_u+K_u) \times 1}$ where $y_{l,u}[s] = y_u[(l-1)(N_u+K_u) + \hat{\Delta}_{t,u} + s]$, $s \in \mathbb{N}^*_{\leq N_u}$. Before the receiver windowing operations are performed, uth UE first performs regular OFDM reception and calculates the received SC symbols from the OFDM symbol samples as:

$$Y_u[:,l,0] = Q_u^T F_{N_u}[0_{N_u \times K_u} I_{N_u}] y_{l,u}, \quad (3)$$

where the first plane of $Y_u \in \mathbb{C}^{M_u \times L_u \times (K_u+1)}$ are the received base SC symbols. Each UE uses a different receiver window duration to receive each RE. The receiver window durations associated with the uth UE's Res are given in $R_u \in \mathbb{N}_{\leq K_u}^{M_u \times L_u}$ calculated as described below, wherein also the calculation of the receiver windowed SC symbols $\hat{Y}_u \in \mathbb{C}^{M_u \times L_u}$ are demonstrated. Channel frequency response (CFR) coefficients at DMRS locations are estimated as:

$$\check{H}[m,l] = \hat{Y}_u[m,l] \oslash P_u[m,l] \quad (4)$$

using nonzero elements of $P_u$. Then, a transform domain channel estimator is applied and estimated CIRs are reduced to their first $K_u$ coefficients. The CIR coefficients of non-pilot carrying symbols are interpolated and extrapolated, and all CFR coefficient estimates $\hat{H}_u$ are obtained. Finally, data symbols are equalized for nonzero elements of $D_u$ and the received symbols are estimated as:

$$\hat{D}_u = \frac{\hat{Y}_u \odot \hat{H}_u^*}{\hat{\sigma}_{n,u}^2 + \hat{H}_u \odot \hat{H}_u^*}, \quad (5)$$

Where $\hat{\sigma}_{n,u}^2 \in \mathbb{R}^{M_u \times L_u}$ is the variance estimated by uth UE for noise, various interference sources and other disruptions.

The present invention involves determination of $T_u$ and $R_u$ for all UEs that maximizes the fair-proportional network capacity. Because these concepts are implemented independently, they are discussed separately below.

In the following paragraphs, the efficient differential calculation of per-RE transmitter windowed samples to prove the optimum transmitter window durations calculations feasible is first discussed. The optimization metric, fair proportional network capacity, is then defined. An algorithm to effectively maximize the fair proportional network capacity is provided. Finally, the computational complexity of the provided algorithm is calculated and discussed.

Figure 3:
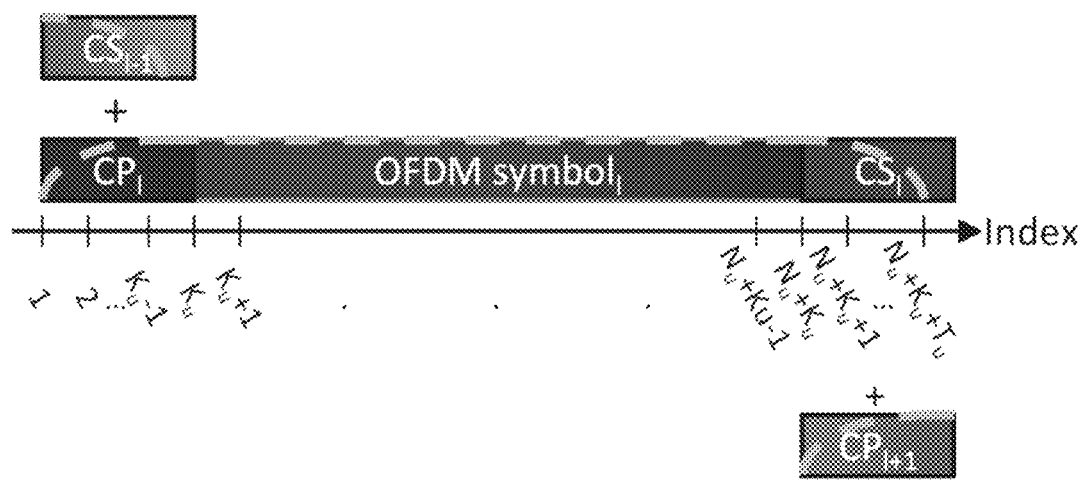
FIG. 3 is an illustration of indexing of t within a demonstration of how transmitter windowed samples are generated by overlapping scaled CP of current and CS of preceding OFDM symbols of which indices are given in the subscripts, in accordance with an embodiment of the present invention.

To convert conventional CP-OFDM samples to per-RE transmitter windowed OFDM samples computationally efficiently, the transmit pulse shape of the mth subcarrier of the lth OFDM symbol to be transmitted to UE u in accordance with $T_u[m,l]$ is contained in the vector $t_{m,l,u} \in \mathbb{R}^{(K_u+N_u+T_u) \times 1}$, of which indexing is demonstrated in FIG. 3, and is calculated to contain the energy of that subcarrier within the band assigned to the UE. Investigating (1), if no transmitter windowing is applied, i.e. the generation of a regular CP-OFDM sample sequence x̌, the contribution from the symbol in the mth subcarrier of the lth OFDM symbol of uth user to the $k \leq K_u$th sample of the OFDM symbol is $\exp(-j2\pi M_{u,m}(k-K_u-1)/N_u)$ $(D_u[m,l]+P_u[m,l])/\sqrt{N_u}$. If transmitter windowing is applied to the RE in interest, the contribution at $k \leq T_u[m,l]$th sample would instead become $$\left( t_{m,l,u}[k] e^{-j\frac{2\pi M_{u,m}(k-K_u-1)}{N_u}} (D_u[m,l]+P_u[m,l]) + t_{m,l,u}[k+ N_u+K_u] e^{-j\frac{2\pi M_{u,m}(k-1)}{N_u}} (D_u[m,l-1]+P_u[m,l-1]) \right) / \sqrt{N_u} =$$

$$\frac{e^{-j\frac{2\pi M_{u,m}(k-1)}{N_u}}}{\sqrt{N_u}} (t_{m,l,u}[k] e^{j2\pi M_{u,m}K_u/N_u} (D_u[m,l]+P_u[m,l]) + t_{m,l,u}[k+N_u+K_u](D_u[m,l-1]+P_u[m,l-1]))$$

Noting that $t_{m,l,u}[k] := 1 - t_{m,l,u}[k+N_u+K_u]$, $\forall k \in \mathbb{Z}_{\leq N_u+K_u}^+$, the $k \leq T_u[m,l]$th sample of the uth user's lth OFDM symbol's per-RE transmitter windowed mth subcarrier can be converted from that generated using a conventional CP-OFDM procedure as:

$$x[(l-1)(N_u+K_u)+k] = \check{x}[(l-1)(N_u+K_u)+k] + \qquad (7)$$

$$\frac{t_{m,l,u}[k+N_u+K_u]\exp\left(-j\frac{2\pi M_{u,m}(k-1)}{N_u}\right)}{\sqrt{N_u}}$$

$$\left((D_u[m,l-1]+P_u[m,l-1]) - \exp\left(j\frac{2\pi M_{u,m}K_u}{N_u}\right)(D_u[m,l]+P_u[m,l])\right).$$

x can be obtained by converting all $T_u[m,l]$ samples of x̌ to per-RE transmitter windowed samples, and this is implied in all further references to (7).

In order to estimate the optimum transmitter window durations, the gNB first estimates the SINR and corresponding capacity for each RE of each user prior to transmission, calculates the fair proportional network capacity, and tries to increase it, iteratively. The samples to be received at the uth UE are first estimated as:

$$\hat{y}_u[t] = \sum_{\tau=0}^{t-1} \hat{h}_{u,\tau,t} x[t-\tau], \, t \in \mathbb{N}_{\leq(K_u+N_u)L_u}^*, \qquad (8)$$

where $\hat{h}_{u,\tau,t}$ are the CIR coefficient predictions at the gNB prior to transmission. The samples are regrouped accordingly to $L_u$ groups of $(K_u+N_u)$ samples each and receiver processed as described earlier, that is, CPs are removed from all symbols, FFTs are applied, and receiver windowing is performed if the gNB is aware that the receiver of interest does so. Results for various cases of receiver windowing are provided in the following description, but for the sake of brevity, it is assumed that the gNB assumes that none of the UEs perform receiver windowing in the remainder of this section. The gNB estimate at the FFT output, $\hat{Y}_u \in \mathbb{C}^{M_u \times L_u}$, is formulated as:

$$\tilde{Y}_u[m,l] = \tilde{H}_u[m,l](D_u[m,l]+\tilde{D}_u[m,l]), \qquad (9)$$

Where $\tilde{H}_u[m,l]$ is the CFR coefficient prediction of the mth subcarrier of the lth OFDM symbol of the uth user, the first term inside the parentheses is due to the data itself and the second term inside the parentheses, shown as $\tilde{D}_u$, is the cumulative ACI, intercarrier interference (ICI) and ISI. Note that since the source samples for all these effects are summed with that of data at the gNB and are passed through the same channel, this cumulative disruption is also scaled with the same channel gain. Accordingly, the number of bits that can be conveyed in the actual noisy transmission channel using the data carrying mth subcarrier of the lth OFDM symbol of the uth UE is:

$$\tilde{\eta}_u[m,l] = \log_2\left(1 + \frac{|\tilde{H}_u[m,l]|^2}{1+|\tilde{H}_u[m,l]|^2|\tilde{D}_u[m,l]|^2}\right) = \qquad (10)$$

$$\log_2\left(1 + \frac{|\tilde{H}_u[m,l]|^2}{1+|\tilde{Y}_u[m,l]-\tilde{H}_u[m,l]D_u[m,l]|^2}\right).$$

If the RE under investigation is scheduled to use a certain modulation and coding scheme (MCS) to carry $b_u[m,l]$ bits, equation (10) is in fact capped as:

$$n_u[m,l] = \min(b_u[m,l], \tilde{\eta}_u[m,l]) \qquad (11)$$

The mean number of bits conveyable to uth UE per RE is:

$$\bar{\eta}_u = E_m[E_l[\eta_u[m,l]]] \qquad (12)$$

and the fair proportional network capacity is defined as the geometric mean of the mean capacities of all UEs in the network:

$$\eta = \sqrt[U]{\prod_{u=1}^{U} \bar{\eta}_u}. \qquad (13)$$

Given the discrete nature of possible window durations in digital pulse shaping and the lack of a relation between window duration and amount of interference incurred on a victim subcarrier for optimum window functions used for the time-varying multipath multiple access channel, an analytical solution to this multivariate integer optimization problem with such a nonlinear utility function is not obvious in view of the teachings of the state of the art.

The choice of transmitter window duration of any RE must balance the SINR degradation to the REs caused by induced ISI, and the SINR improvement to all other REs, particularly those of other UEs. The transmitter window duration affects the whole network, hence it must be calculated keeping the whole network in mind, meaning (13) must be calculated and optimized at the gNB prior to transmission. However, explicitly calculating eqs. (7) and (13) every time, for each RE, is computationally exhaustive. The aforementioned equations are provided to provide the necessary understanding, but the following equations will be used in the computationally efficient estimation of optimum transmitter window durations. Consider that it is desirable to test whether setting the transmitter window duration of the RE in the $\dot{m}$th subcarrier of the $\dot{\imath}$th OFDM symbol of the $\dot{u}$th user to $T_{\dot{u}}[\dot{m},\dot{\imath}]$ improves the fair proportional network capacity or not. Assume the transmitter windowed samples are calculated per eq. (7). To keep expressions clear, let the difference in the kth CP sample in interest per eq. (7) be referred as:

$$\dot{x}_k := x[(\dot{\imath}-1)(N_{\dot{u}}+K_{\dot{u}})+k] - \bar{x}[(\dot{\imath}-1)(N_{\dot{u}}+K_{\dot{u}})+k] = \qquad (15)$$

$$\frac{t_{\dot{m},\dot{\imath},\dot{u}}[k+N_{\dot{u}}+K_{\dot{u}}]\exp\left(-j\frac{2\pi M_{\dot{u},\dot{m}}(k-1)}{N_{\dot{u}}}\right)}{\sqrt{N_{\dot{u}}}}$$

$$\left((D_{\dot{u}}[\dot{m},\dot{\imath}-1]+P_{\dot{u}}[\dot{m},\dot{\imath}-1])-\exp\left(j\frac{2\pi M_{\dot{u},\dot{m}}K_{\dot{u}}}{N_{\dot{u}}}\right)(D_{\dot{u}}[\dot{m},\dot{\imath}]+P_{\dot{u}}[\dot{m},\dot{\imath}])\right).$$

The next step is to regenerate eq. (9) for all UEs. However, as the number of changed symbols is limited, whole sample sequences do not need regeneration, but only the received samples that are affected by the changed samples, and fall into a valid receiver window, must be recalculated. For example, assuming a conventional rectangular window is utilized as the receivers, which will be assumed throughout the rest of the description, any changes to CP samples will be discarded as they fall outside the receiver window, hence they need not be calculated. In this case, first $T_{\dot{u}}[\dot{m},\dot{\imath}]$ modified samples that the channel would leak into the symbol duration must be calculated for each UE, and the kth sample (per indexing of FIG. 3) of the transmitter windowed received sample sequence $\bar{y_u}$ can be written as:

$$\bar{y_u}[(\dot{\imath}-1)(N_{\dot{u}}+K_{\dot{u}})+k] = \qquad (16a)$$

$$\sum_{\tau=0}^{K_{\dot{u}}} \hat{h}_{u,\tau,(\dot{\imath}-1)(N_{\dot{u}}+K_{\dot{u}})+k} x[(\dot{\imath}-1)(N_{\dot{u}}+K_{\dot{u}})+k-\tau]$$

$$= \sum_{\tau=0}^{K_{\dot{u}}} \hat{h}_{u,\tau,(\dot{\imath}-1)(N_{\dot{u}}+K_{\dot{u}})+k}(\bar{x}[(\dot{\imath}-1)(N_{\dot{u}}+K_{\dot{u}})+k-\tau]+\dot{x}_{k-\tau}) \qquad (16b)$$

$$= \hat{y}_u[(\dot{\imath}-1)(N_{\dot{u}}+K_{\dot{u}})+k] + \sum_{\tau=k-T_{\dot{u}}[\dot{m},\dot{\imath}]}^{K_{\dot{u}}} \hat{h}_{u,\tau,(\dot{\imath}-1)(N_{\dot{u}}+K_{\dot{u}})+k}\dot{x}_{k-\tau} \qquad (16c)$$

Similarly, referring to the difference in the kth relevant (belong to the OFDM symbol affected by the windowing operation) sample to be received by the $u$th UE as:

$$\dot{y}_{u,k} = \bar{y_u}[(\dot{\imath}-1)(N_{\dot{u}}+K_{\dot{u}})+k] - \hat{y}_u[(\dot{\imath}-1)(N_{\dot{u}}+K_{\dot{u}})+k] \qquad (17)$$

$$= \sum_{\tau=k-T_{\dot{u}}[\dot{m},\dot{\imath}]}^{K_{\dot{u}}} \hat{h}_{u,\tau,(\dot{\imath}-1)(N_{\dot{u}}+K_{\dot{u}})+k}\dot{x}_{k-\tau} \qquad (18)$$

The FFT outputs also only need to be updated for a few samples and taking the FFT of the whole OFDM symbol is not necessary. Using the previously calculated received symbol estimates, if there is an update to symbol estimate in the mth subcarrier of the lth OFDM of the uth user, the new symbol can be estimated by adding the contribution from the updated samples and removing the contribution from the original samples as:

$$\bar{Y}_u[m,l] = \tilde{Y}_u[m,l] + \sum_{k=K_u+1}^{K_u+T_{\dot{u}}[\dot{m},\dot{\imath}]} \frac{\exp\left(j\frac{2\pi M_{u,m}(k-K_u-1)}{N_u}\right)}{\sqrt{N_u}}\dot{y}_{u,k} \qquad (19)$$

The difference in the updated symbol estimate in the uth user's lth OFDM symbol's mth subcarrier due to the proposed window is denoted by:

$$\dot{Y}_{u,l,m} = \bar{Y}_u[m,l] - \tilde{Y}_u[m,l] \qquad (20)$$

$$= \sum_{k=K_u+1}^{K_u+T_{\dot{u}}[\dot{m},\dot{\imath}]} \frac{\exp\left(j\frac{2\pi M_{u,m}(k-K_u-1)}{N_u}\right)}{\sqrt{N_u}}\dot{y}_{u,k} \qquad (21)$$

Accordingly, new channel capacity becomes:

$$\bar{n}_u[m,l] = \log_2\left(1+\frac{|\tilde{H}_u[m,l]|^2}{1+|\bar{Y}_u[m,l]-\tilde{H}_u[m,l]D_u[m,l]|^2}\right) \qquad (22a)$$

$$= \log_2\left(1+\frac{|\tilde{H}_u[m,l]|^2}{1+|\dot{Y}_{u,l,m}+\tilde{Y}_u[m,l]-\tilde{H}_u[m,l]D_u[m,l]|^2}\right) \qquad (22b)$$

Note that the term $\tilde{Y}_u[m,l]-\tilde{H}_u[m,l]D_u[m,l]$ was previously calculated in eq. (10) and the introduced difference term can simply be added to the previously calculated sum. Notice that the capacities of only the RE of which transmit pulses overlap with that of the RE under investigation are changed, and only these need to be compared. Accordingly, assuming that the MCSs are not decided yet, it is to the network's advantage to transmitter window the RE under investigation with the according window duration if the following is positive:

$$\eta_\Delta = \prod_{u=1}^{U}\left(\sum_{m=1}^{M_u}\bar{n}_u\left[m,\left\lceil\frac{lN_{\dot{u}}}{N_u}\right\rceil\right]\right) - \prod_{u=1}^{U}\left(\sum_{m=1}^{M_u}\tilde{n}_u\left[m,\left\lceil\frac{lN_{\dot{u}}}{N_u}\right\rceil\right]\right) \qquad (23)$$

Or if the MCSs are already decided, $\eta_\Delta$ becomes:

$$\eta_\Delta = \prod_{u=1}^{U}\left(\sum_{m=1}^{M_u}\min\left(b_u\left[m,\left\lceil\frac{lN_u}{N_u}\right\rceil\right], \tilde{\eta}_u\left[m,\left\lceil\frac{lN_u}{N_u}\right\rceil\right]\right)\right) - \quad (24)$$

$$\prod_{u=1}^{U}\left(\sum_{m=1}^{M_u}\min\left(b_u\left[m,\left\lceil\frac{lN_u}{N_u}\right\rceil\right], \breve{\eta}_u\left[m,\left\lceil\frac{lN_u}{N_u}\right\rceil\right]\right)\right)$$

Consequently, Algorithm 1 is proposed to iteratively calculate the optimum transmitter windowing duration at the gNB.

Algorithm 1: Estimate $T_u$, $\forall_u \in N_{\leq U}^*$ & Calculate x

1:  $T_u \leftarrow 0, \forall u \in N_{\leq U}^+$
2:  $\breve{x} \leftarrow (1))$
3:  for all $u \in N_{\leq U}^*$, $\tau \in N_{\leq K_u}$, $t \in N_{\leq (N_u - K_u)L_u}^*$ do
4:    Predict DL CIRs $\tilde{h}_{u,\tau,t}$ and CFRs $\tilde{H}_u$
5:  end for
6:  for all $u \in N_{\leq U}^*$, $m \in N_{\leq M_u}^*$, $l \in N_{\leq L_u}^*$ do
7:    Calculate eqs. (8) to (10)
8:    $\lambda_u[m,l] \leftarrow (10)$
9:    if MCSs fixed then
10:     $\lambda_u[m,l] \leftarrow \lambda_u[m,l] - b_u[m,l]$
11:   end if
12: end for
13: for $\dot{m}, \dot{l}, \dot{u} \leftarrow \arg\max_{m,l,u}\lambda_u[m,l], \arg\min_{m,l,u}\lambda_u[m,l]$ do
14:   for $T_{\dot{u}}[\dot{m},\dot{l}]_{\leftarrow 1, K_{\dot{u}}}$ do
15:     $\eta_\Delta \leftarrow (23)$ or $(24)$
16:     if $\eta_\Delta > 0$ then
17:       for all $u \in N_{\leq U}^*$, $m \in N_{\leq M_u}^*$ do
18:         $\tilde{\eta}_u\left[m,\left\lceil\frac{lN_u}{N_u}\right\rceil\right] \leftarrow \breve{\eta}_u\left[m,\frac{lN_u}{N_u}\right]$
19:       end for
20:     else
21:       if $T_{\dot{u}}[\dot{m},\dot{l}] \leftarrow T_{\dot{u}}[\dot{m},\dot{l}] - 1$
22:       if $T_{\dot{u}}[\dot{m},\dot{l}] > 0$ then
23:         for all $k \in N_{\leq T_{\dot{u}}[\dot{m},\dot{l}]}^*$ do
24:           $\breve{x}[(\dot{l}-1)(N_{\dot{u}}+K_{\dot{u}})+k] \leftarrow (7)$
25:         end for
26:       end if
27:       break
28:     end if
29:   end for
30: end for The variable introduced in Algorithm 1, $\lambda_u \in \mathbb{R}^{M_u \times L_u}$, corresponds to the excess SNR of the RE if MCSs are determined, or to the SNR of the RE if not. On par with the motivation behind Algorithm 1, the REs that have the higher excess SNR are more likely to have longer windowing durations resulting in more significant overall interference reduction before those with lesser impact are pursued. Since there is not additional extension to CP, which is currently designed only to support the multipath channel, all REs are assumed to have a zero transmitter windowing duration initially. The duration is incremented instead of a binary search as the expected window durations are short and calculation of shorter durations are computationally less exhaustive, as will be later described. The algorithm is provided in a recursive manner for brevity, where the necessary equations are invoked during invoking eqs. (23)/(24). It should also be noted that Algorithm 1 runs only at the gNB which virtually has no computational complexity and power limitations, while the UEs are unaware of the process and are not passed any information. This makes Algorithm 1 forward and backward compatible with all communication standards.

Channel prediction, and mean SNR and capacity estimation for each user is assumed to be performed for link adaptation purposes regardless of Algorithm 1 and is not considered in the computational complexity of the proposed algorithm. There are many computational complexity reduction implementation tricks further discussed in the above description. The computational complexity of the algorithm is derived by counting the number of operations performed for each step and how many times those steps were invoked. Table I shows the number of real additions and multiplications required to test whether windowing an RE at the transmitter with a duration of T is beneficial, i.e. executing line 15 of Algorithm 1, how many times each equation is invoked, and the total number of necessary operations.

TABLE I

COMPUTATIONAL COMPLEXITY OF EACH CALL TO (23)/(24)

| Eq. | #Add | #Mult. | #Inv. |
|---|---|---|---|
| (15) | 6T | 10T | 1 |
| (18) | $2T^2$ | $2T^2 + 2T$ | U |
| (21) | $4T - 2$ | $4T$ | $\sum_{u=1}^{U} M_u$ |
| (22b) | 3 | 3 | $\sum_{u=1}^{U} M_u$ |
| (23)/(24) | $1 + \sum_{u=1}^{U}(M_u - 1)$ | $U - 1$ | 1 |
| Total | $2UT^2 +$ $T\left(4\sum_{u=1}^{U} M_u + 6\right) +$ $2\sum_{u=1}^{U} M_u + 1 - U$ (25) | $2UT^2 +$ $T\left(2U + 4\sum_{u=1}^{U} M_u + 10\right) +$ $U + 3\sum_{u=1}^{U} M_u - 1$ (26) | |

It is shown that each test requires (25) real additions and (26) real multiplications. Accordingly, determining the optimum transmitter window durations for all REs in the transport block, and windowing the sample sequence accordingly, results in $$\sum_{u=1}^{U}\sum_{l=1}^{L_u}\sum_{m=1}^{M_u}\left(2T_u[m,l] + \sum_{T=1}^{\min(T_u[m,l]+1,K_u)}\right) \quad (25)$$

real additions and $$\sum_{u=1}^{U}\sum_{l=1}^{L_u}\sum_{m=1}^{M_u}\sum_{T=1}^{\min(T_u[m,l]+1,K_u)} \quad (26)$$

real multiplications. Other than this, Algorithm 1 also needs to calculate the fair proportional network capacity for the non-windowed case, requiring $$\sum_{u=1}^{U}(M_u-1)L_u$$

real amnions, and max $L_u$ real multiplications if there are only 2 different subcarrier spacings or $$\frac{3}{2}\max L_u$$

real multiplications it all three subcarrier spacing possibilities for the band is used. Statistics regarding the distribution of T and according number of calculations for the evaluated scenarios are provided in the following sections. Regarding the timewise complexity, it should be noted that the calculation can be done in parallel for the min $L_u$ independent symbol groups, and therefore the worst-case time complexity of the described computationally efficient implementation is $O(\Sigma_u M_u K_u^2)$, whereas a more operation count- and memory-wise exhaustive implementation can complete in $O(\max(K_u)+\max(M_u))$, which may be feasible at the gNB. Further operational and timewise computational complexity reduction can be obtained if the Algorithm is only run for a subset of subcarriers.

A fully theoretical approach requiring knowledge regarding channel conditions of at least the UEs utilizing adjacent bands has been previously described. Although the previously described approach is non-data-aided and is theoretically optimal, it may not be feasible for use especially in the DL due to the extent of required data at the UEs, and it does not utilize the guide embedded in the received resources.

In accordance with the present invention, calculating receiver window duration in a non-data-aided approach solely using second order statistics of received symbols for both LTE and 5G NR is proposed. Sole dependence on second order statistics allows each UE to perform their own estimation in a decentralized manner without the need for network-wide channel and data knowledge. Since non-data-aided calculations are done only by the intended receiver and receiver windowing only affects the SINR of the RE that the operation is applied to, there is not need to convey any information to and from other nodes and maximization of fair-proportional network capacity is achieved by independently maximizing the capacity of each RE. This makes the proposed algorithm backward and forward compatible with any communication standard and protocol. Furthermore, computationally efficient receiver windowing of OFDM symbols for multiple receiver window durations are discussed and the computational complexity of the proposed technique is derived.

Figure 4:
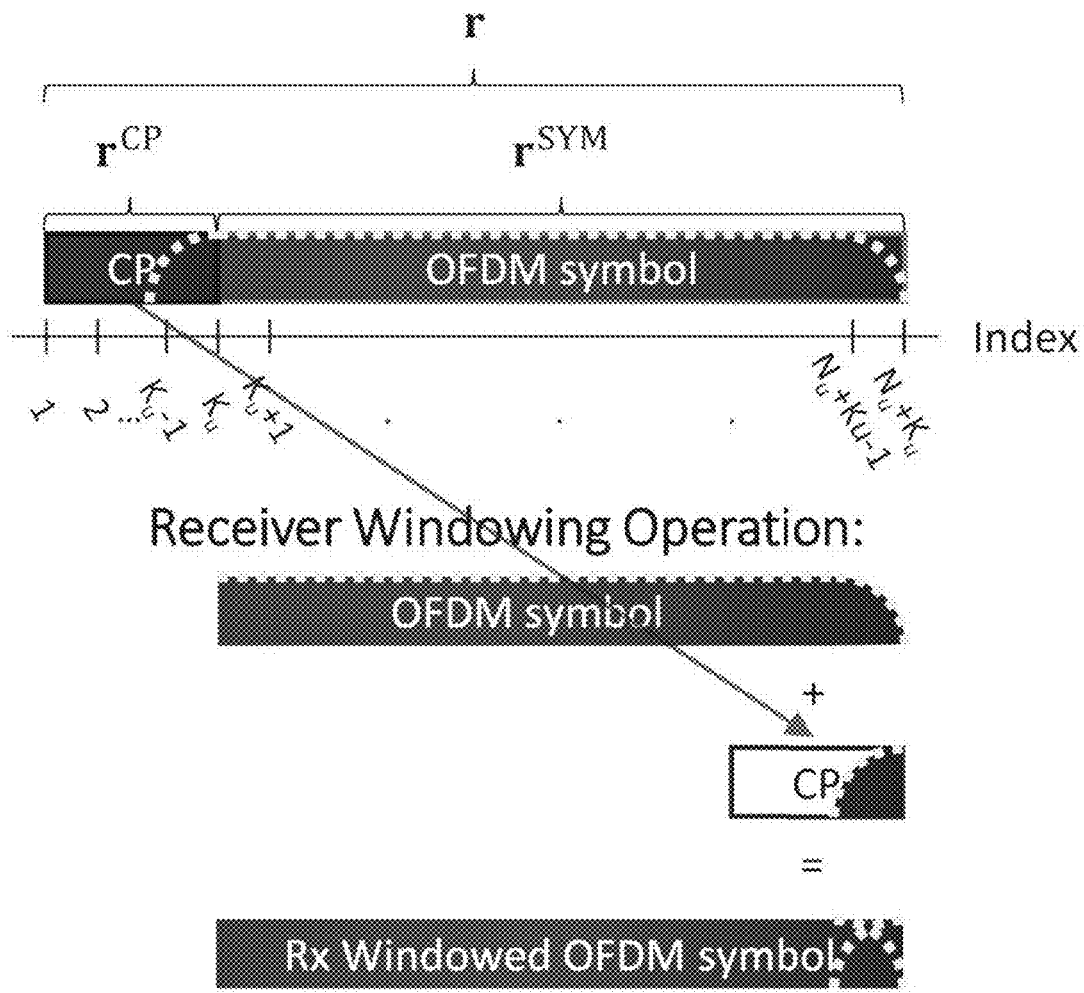
FIG. 4 is an illustration demonstrating indexing of r and identification of its parts $r^{CP}$ and $r^{SYM}$ with a demonstration of how receiver windowing operation is performed, in accordance with an embodiment of the present invention.

Assume uth UE uses the receiver windowing pulse $r_{m,l,u} \in \mathbb{R}^{(N_u \times K_u) \times 1}$, of which indexing is shown in FIG. 4, to reject the energy outside the UE's band with a receiver windowing duration of $R_u[m,l]$ to receive the mth subcarrier of lth OFDM symbol. A visual investigation of FIG. 4 reveals that the analyzed receiver windowed single carrier symbols differ from that of the FFT output by the last $R_u[m,l]$ samples. The contribution from the $s \in \mathbb{N}_{K_u < s \le K_u + N_u}$ th sample to the FFT output, if windowing is not performed is, $y_{l,u}[s]$ $\exp(j2\pi\pi M_{u,m}(s-K_u-1)/N_u)/\sqrt{N_u}$. If windowing is applied, for $s \in \mathbb{N}_{K_u < s \le K_u + N_u}$, the contribution instead becomes:

$$(y_{l,u}[s]r_{m,l,u}[s]+y_{l,u}[s-N_u]r_{m,l,u}[s-N_u])\frac{\exp\left(j\frac{2\pi M_{u,m}(s-K_u-1)}{N_u}\right)}{\sqrt{N_u}} \quad (27)$$

Accordingly, by removing the non-windowed contribution from all windowed samples and adding their respective windowed contribution to the FFT output, the SC symbol that is receiver windowed with window duration $0 < r \le K_u$ can be written as:

$$Y_u[m,l,r] = Y_u[m,l,0] + \qquad (28)$$

$$\sum_{s=N_u+K_u-r+1}^{N_u+K_u}(y_{l,u}[s](r_{m,l,u}[s]-1)+y_{l,u}[s-N_u]r_{m,l,u}[s-N_u])$$

$$\frac{\exp\left(j\frac{2\pi M_{u,m}(s-K_u-1)}{N_u}\right)}{\sqrt{N_u}}$$

Plugging $r_{m,l,u}[s]=1-r_{m,l,u}[s-N_u]$ for the windowed region, eq. (28) can be simplified to:

$$Y_u[m,l,r] = \qquad (29)$$

$$Y_u[m,l,0] + \sum_{s=N_u+K_u-r+1}^{N_u+K_u}(y_{l,u}[s-N_u]-y_{l,u}[s])r_{m,l,u}[s-N_u]$$

$$\frac{\exp\left(j\frac{2\pi M_{u,m}(s-K_u-1)}{N_u}\right)}{\sqrt{N_u}}$$

which allows computing the receiver windowed symbols with reduced computational complexity by obtaining the windowed symbol from the conventionally received symbol.

The optimum receiver windowing duration similarly maximizes eq. (10). However, unlike the gNB that has predicted the CFR coefficients and already known the payload, the UEs know neither. However, there are other higher order statistics that can be exploited by the UEs. Similar to eq. (9), one can write:

$$Y_u[m,l,r]=H_u[m,l](D_u[m,l]+P_u[m,l])+\tilde{N}_u[m,l,r]+ \tilde{n}_u[m,l,r], \qquad (30)$$

where $H_u[m,l]$ is the actual CFR coefficient affecting of the mth subcarrier of the lth OFDM symbol of the uth user, $\tilde{N}_u[m,l,r]$ is the combined ACI, ICI and ISI affecting the aforementioned RE is receiver window duration r is used, and $\tilde{n}_u[m,l,r]$ is the noise value affecting the aforementioned RE. Let the 2-tuple elements of the set $\mathbb{P}_u[\dot{m},\dot{l}]$ refer to the subcarrier and OFDM symbol indices of P REs that are statistically expected to experience the channels most correlated with $H_u[\dot{m},\dot{l}]$. To keep equations concise, one may only use $D_u[m,l]$ to refer to $D_u[m,l]+P_u[m,l]$ from this point onward. Even though no element other than $P_u[m,l]$ in the equation is known, the UE can still obtain:

$$\check{Y}_u[\dot{m},\dot{l},r] = \text{var}[\{Y_u[m,l,r],(m,l)\in\mathbb{P}_u[\dot{m},\dot{l}]\}] \quad (31a)$$

$$= \text{var}[\{H_u[m,l]D_u[m,l] + \tilde{N}_u[m,l,r] + \tilde{n}_u[m,l,r]\}] \quad (31b)$$

$$= \text{var}[\{H_u[m,l]D_u[m,l]\}] + \text{var}[\{\tilde{n}_u[m,l,r]\}] + \text{var}[\{\tilde{N}_u[m,l,r]\}], \quad (31c)$$

where the set definitions $(m,l)\in\mathbb{P}_u[\dot{m},\dot{l}]$ were removed after the first line to keep equations concise, but are always implied throughout the rest of this description for all mean and variance operations, and an equal-weight variance is assumed, or in probability terms, all elements are assigned the same $1/P$ probability. Weighting elements with the correlations between $H_u[m,l]$ and $H_u[\dot{m},\dot{l}]$ is optimum, however, the equiweight implementation drastically reduces the computational complexity, as will be shown below, without an observable performance loss. Note that since $\tilde{n}_u[m,l,r] \sim CN(0,1) \forall_{m,l,r}$, although the noise value itself changes with windowing, the noise variance remains unity. Furthermore, as ICI and ISI are separated, the variance in the actual channel coefficients can be assumed to remain constant regardless of window duration as well. Thus, the CFR coefficient, transmitted data and noise variance remain constant regardless of applied window, but the combined interference and its variance varies with the windowing operation. Although it is impossible to distinguish between these components by looking at the effects of windowing on a single received symbol, the spectrotemporal correlation of channel and interference can be exploited to identify the amount of combined interference in a group of REs. That is, although $\text{var}[\{\tilde{N}_u[m,l,r], (m,l)\in\mathbb{P}_u[\dot{m},\dot{l}]\}]$ can not be found explicitly, one can conclude that:

$$\underset{r}{\text{argmin}}\, \check{Y}_u[\dot{m},\dot{l},r] \triangleq \underset{r}{\text{argmin}}\, \text{var}[\{\tilde{N}_u[m,l,r], (m,l)\in\mathbb{P}_u[\dot{m},\dot{l}]\}]. \quad (32)$$

The optimum receiver windowing duration calculation algorithm utilizes eq. (32) to minimize the combined interference energy and maximize capacity. With similar reasoning to Algorithm 1, Algorithm 2 also starts with the assumption of zero initial window duration, and checks to see whether longer window durations are beneficial for each RE.

---

Algorithm 2: Estimate $R_u$ & $\hat{Y}_u$

1: $R_u \leftarrow 0$
2: for all $m \in M_u$, $l \in L_u$ do
3:   $\check{Y}_u[m,l,0] \leftarrow$ (34b)
4:   for $r \leftarrow 1, K_u$ do
5:     $\check{Y}_u[m,l,r] \leftarrow$ (34c)
6:     if $\check{Y}_u[m,l,r] > \check{Y}_u[m,l,r-1]$ then
7:       $R_u[m,l] \leftarrow r - 1$
8:       break
9:     end if
10:  end for
11:  $\hat{Y}_u[m,l] \leftarrow$ (29)
12: end for

---

One can investigate a possible reduced complexity implementation of this idea, particularly utilizing the relation between $Y_u[m,l,0]$ and $Y_u[m,l,r]$ as shown in eq. (28). First define:

$$\acute{y}_u[m,l,r] = Y_u[m,l,r] - Y_u[m,l,0] \quad (33a)$$

$$= \sum_{s=N_u+K_u-r+1}^{N_u+K_u} (y_{l,u}[s-N_u] - y_{l,u}[s]) \quad (33b)$$

$$r_{m,l,u}[s-N_u] \frac{\exp\left(J\frac{2\pi M_{u,m}(s-K_u-1)}{N_u}\right)}{\sqrt{N_u}}$$

to keep following equations concise. Then:

$$\check{Y}_u[\dot{m},l,r] = \sum_{(m,l)\in\mathbb{P}_u[\dot{m},\dot{l}]} \frac{\left|Y_u[m,l,r] - \sum_{(\dot{m},\dot{l})\in\mathbb{P}_u[\dot{m},\dot{l}]} Y_u[\dot{m},\dot{l},\dot{r}]/P\right|^2}{P} \quad (34a)$$

$$= \frac{1}{P^3} \sum_{(m,l)\in\mathbb{P}_u[\dot{m},\dot{l}]} \left|Y_u[m,l,r](P-1) - \sum_{(\dot{m},\dot{l})\in\mathbb{P}_u[\dot{m},\dot{l}]\setminus(m,l)} Y_u[\dot{m},\dot{l},r]\right|^2 \quad (34b)$$

$$= \frac{1}{P^3} \sum_{(m,l)\in\mathbb{P}_u[\dot{m},\dot{l}]} \left|Y_u[m,l,0](P-1) - \sum_{(\dot{m},\dot{l})\in\mathbb{P}_u[\dot{m},\dot{l}]\setminus(m,l)} Y_u[\dot{m},\dot{l},0] + \acute{y}_u[m,l,r](P-1) - \sum_{(\dot{m},\dot{l})\in\mathbb{P}_u[\dot{m},\dot{l}]\setminus(m,l)} \acute{y}_u[\dot{m},\dot{l},r]\right|^2 \quad (34c)$$

demonstrates that once $$Y_u[m,l,0](P-1) - \Sigma_{(\dot{m},\dot{l})\in\mathbb{P}_u[\dot{m},\dot{l}]\setminus(m,l)} Y_u[\dot{m},\dot{l},0] \quad (35)$$

is calculated, the variance of the windowed cases can be calculated by adding the window differences and summing the squared magnitudes. The advantage of the equiweight assumption becomes clear at this point, a simple investigation reveals that once $\check{Y}_u[\dot{m},\dot{l},\dot{r}]$ is calculated for an RE, the same calculation for neighboring REs only require adding and removing contributions from few REs. More information on computation complexity is provided below.

Calculating eq. (35) for $(m,l)\leftarrow(m_1,l_1)\in\mathbb{P}_u[\dot{m},\dot{l}]$ for a single RE requires 2P real additions and 2 real multiplications. The result of the same equation for another RE with indices $(m,l)\leftarrow(m_2,l_2)\in\mathbb{P}_u[\dot{m},\dot{l}]$ can be obtained by adding $P(Y_u[m_2,l_2,0]-Y_u[m_1,l_1,0])$ to the previously calculated value, resulting in 4 real additions and 2 real multiplications. Thus, calculating eq. (35)$\forall (m,l)\in\mathbb{P}_u[\dot{m},\dot{l}]$ requires a total of 6P-4 real additions and 2P real multiplications.

Trials show that the subsets $\mathbb{P}_u[\dot{m},\dot{l}]$ differ at most by $\log(c+P)$ individual REs for neighbor REs under vehicular channels for statistically meaningful P values, where c is a small positive constant. While the mean subset difference is well below that for the possible transmission time interval (TTI) durations and bandwidth part configurations in NR, $\log(P)$ will be assumed for all REs as the mean asymptotically reaches this number with increasing number of allocated slots and REs, and to mitigate c. Thus after eq. (35) is calculated for an RE for $\mathbb{P}_u[\dot{m}_1,\dot{l}_1]$ the results can be generalized for the same RE for another $\mathbb{P}_u[\dot{m}_2,\dot{l}_2]$, $(\dot{m}_2,\dot{l}_2)\leftarrow\exists\{(\dot{m}_1\pm 1,\dot{l}_1), (\dot{m}_1,\dot{l}_1\pm 1)\}$ by adding $P(\Sigma_{(\dot{m},\dot{l})\in\mathbb{P}_u[\dot{m}_2,\dot{l}_2]} Y_u[\dot{m},\dot{l},0] - \Sigma_{(\dot{m},\dot{l})\in\mathbb{P}_u[\dot{m}_1,\dot{l}_1]} Y_u[\dot{m},\dot{l},0])$ to the previous findings, which requires 4 log(P) real additions and 2 real multiplications. The findings can then similarly propagate to other REs∈$\mathbb{P}_u[\dot{m}_2,\dot{i}_2]$ by performing 4 real additions and 2 real multiplications, each as described above. Therefore, number of operations required to obtain eq. (35) $\forall (m,l) \in \mathbb{P}_u[\dot{m},\dot{i}]$ is upper bounded by $4(M_u L_u(P+\log(P))-1)-\log(P))+2P$ real additions and $2PM_u L_u$ real multiplications.

A direct investigation reveals that each eq. (33b) calculation requires 6r-2 real additions and 6r real multiplications to obtain the symbol windowed with window duration r. Once the relevant eq. (33b) values are calculated, the number of equations required to calculate the difference $\Sigma_{(\dot{m},\dot{i}) \in \mathbb{P}_u[\dot{m},\dot{i}] \setminus (m,l)} \ddot{y}_u[\dot{m},\dot{i},r]$ in eq. (34c) is the same as the number of operations required to obtain eq. (35). It should be noted that these values are only required for $(m,l) \in \mathbb{P}_u[\dot{m},\dot{i}]$ if $\ddot{Y}_u[\dot{m},\dot{i},r]$ is being calculated, which is not always needed.

After both differences in eq. (34c) are obtained, the sum of the squared magnitudes of the sum of differences can be calculated to finalize eq. (34c) calculation. This requires 3P-1 real additions and 2P real multiplications. If $R_u[m,l]=R$, (34c) must be calculated $\forall r \in \mathbb{N}_{\leq \min(R+1,K_u)}^*$. Once $R_u$ is found, eq. (29) is performed to obtain windowed symbols to continue reception, which requires only $2\#\{R_u \neq 0\}$ real additions and no multiplications. Some statistics for $R_u$ and number of operations performed for vehicular channel conditions are provided below. It should also be noted that the worst case time complexity of the described efficient implementation is on the order of $O(K_u^2 PM_u L_u)$, while a more straightforward operation count- and memory-wise exhaustive implementation can run within $O(P+K_u)$.

The algorithms presented above are computationally tailored around the basic assumption that both transmitter and receiver window durations are expected to be short, as the utilized extension was solely intended for the channel. The following description shows that this assumption holds, there are also other characteristics that can be exploited, such as the spectrotemporal correlation of window durations, and a non-obvious but comprehensible peak in the statistical receiver window duration probability distribution, all of which are presented below. The previous description aimed to describe the basic ideas and only simple, universal algorithmic implementation specific details in the most comprehensible manner. Further possible reductions in computational complexity are mentioned, along with numerical findings, below.

Although the proposed method is formulated for networks with any number of UEs, in an exemplary embodiment, a simple network limited to a base station (BS) and two UEs equally sharing 7.68 MHz system bandwidth is considered, for the sake of simplicity, in explaining the specific details of the invention. Said simplification also allows for clearer presentation of the results. This exemplary network is realized numerous times with independent and random user data and instantaneous channels, and all presented results are the arithmetic means of all realizations, unless otherwise specified. In this exemplary embodiment, one of the UEs is a high mobility node experiencing a channel that has 30 ns RMS delay spread and 120 km/h mobility, hereinafter referred to as the "'f' ast user", communicating using 60 subcarriers of an OFDM numerology with subcarrier spacing of $\Delta_{f_f}$=60 kHz. The second UEs is a moderate mobility node experiencing a channel that has 100 nm RMS delay spread and 30 km/h mobility, hereinafter referred to as the "'s'low user", communicating using 120 subcarriers of the $\Delta_{f_s}$=30 kHz numerology in the adjacent band. The power delay profile (PDP) of fast user's channel is 3GPP tapped delay line (TDL)-A in ½, TDL-B in ⅓ and TDL-C in ⅙ of the simulations to demonstrate the operability of the novel method under different channel models. Similarly, the PDP of slow user's channel is 3GPP TDL-B in ½, and TDL-A or TDL-C each in ¼ of the simulations. The Doppler spectra of both channels are assumed to be classical Jakes at all times. There is a 240 kHz guard band between users. The SNR of each user is swept from 5 dB to 15 dB, during which the SNR of the other user is fixed at 10 dB.

Results are obtained for duration of one NR format 4 slot in the slow user's reference, where both flexible symbols are utilized for UL. The UL transmission interval of a slot followed by the DL transmission interval of the consecutive slot is investigated. There's a timing offset of 64 samples in the UL, whereas the consequent DL period is synchronous. The UL DMRS received at the gNB, which are physical uplink shared channel (PUSCH) DMRS type B mapped, are used to estimate the channel. Only this time invariant estimate is used in Algorithm 2 for the following DL transmission interval. This presents the worst-case performance of especially Algorithm 2 under minimum available information. The rate of performance improvement for increasing number of consecutive slots with the help of channel prediction is left for future work. Algorithm 1 utilizes the transmitted DL DMRS, which are single port single layer mapped with crucial parameters uniquely defining the mapping dmrs-AdditionalPosition 3 and dmrs-TypeA-Position pos2. No windowing or power control is applied to the UL signals as well, reducing the performance of solely the proposed methods, making it the worst-case scenario.

Unless otherwise specified, both UEs utilize a normal CP overhead of 9/128 with no additional extension for windowing at all times, thus conserving standard 5G NR symbol structure. For comparison, optimum fixed extension windowing algorithms known in the art are also featured utilizing the standard extended CP overhead of 25% and the additional extension is used for either transmitter or receiver windowing, as well as filtered-OFDM (F-OFDM) and N-Continuous OFDM (NC-OFDM), the tone offset for the former, in accord with the resource allocation, being 7.5 and 3.5 tones for the slow and fast user, respectively; and the N parameters for the latter being $N_{fast}$=1 and $N_{slow}$=2, per the original work and both receivers use the iterative correcting receiver performing 8 iterations. Link adaptation is omitted in the system, all RBs are assigned the same MCS, which consists of QPSK modulation and (21/32)×(7/15) standard and extended Bose-Chaudhuri-Hocquenghem (BCH) Turbo product code for the slow user and (7/16)×(7/15) for the fast user, at all times. The MCSs are chosen such that both users operate slightly below the target bit-error rate (BER) at the minimum SNR, thus the SNR difference between the users can be referred to as the excess SNR for the utilized SNR values, P←33 for both users in Algorithm 2 so that a meaningful z-test can be performed.

Figure 5:
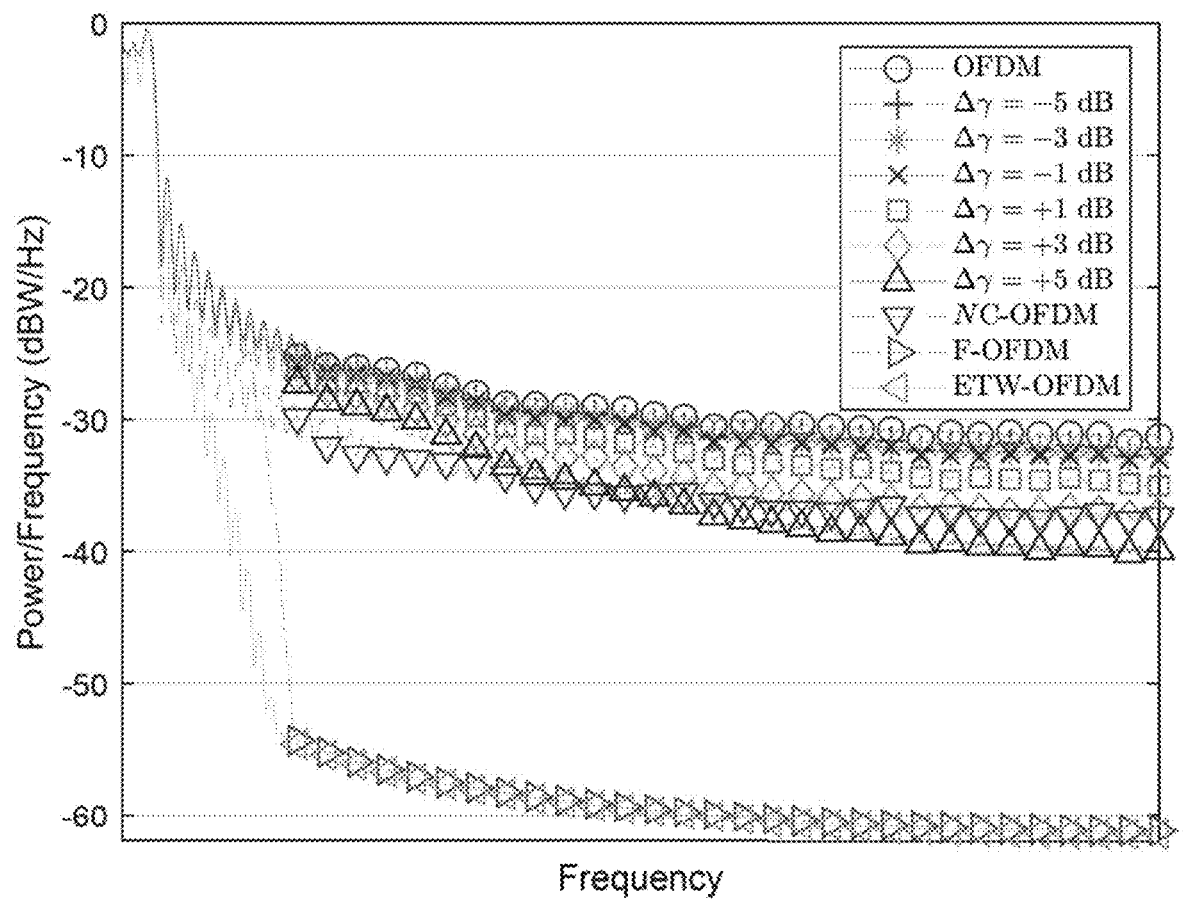
FIG. 5 is a graphical illustration of OOB emission of investigated modulations, in accordance with an embodiment of the present invention.

The OOB emission of investigated waveforms are depicted in FIG. 5, where the lines denoted with $\Delta_y$ is the results for Algorithm 1, for which the windowed user's average SNR is greater than that of the victim by the provided value, and the sampling points of the victim subcarriers are marked to distinguish between modulations and to provide means to understand the unorthodox frequency localization characteristics of F-OFDM and optimum fixed extension transmitter windowing (ETW) algorithm to unfamiliar readers. Both F-OFDM and ETW-OFDM have unmatched interference performance in the victim's band, but F-OFDM requires the receiver to perform matched filtering, and ETW-OFDM requires an extension that may disturb the standard frame structure, or reduced throughput if the standard extensions are used in vehicular channels as seen in Table II.

TABLE II

FAIR PROPORTIONAL NETWORK THROUGHPUT OF TESTED MODULATIONS

| Modulation | Throughput (Mbps) | Gain over CP-OFDM |
|---|---|---|
| ETW-OFDM | 1.1949 | −15.832% |
| ERW-OFDM | 1.1952 | −15.708% |
| NC-OFDM | 1.3927 | −1.456% |
| CP-OFDM | 1.3985 | — |
| Algorithm 1 | 1.3986 | +0.042% |
| TW-OFDM (w/o Ext) | 1.3987 | +0.049% |
| F-OFDM | 1.3988 | +0.057% |
| Algorithm 2 | 1.3990 | +0.071% |
| Algorithm 1 + Algorithm 2 (independent) | 1.3991 | +0.078% |
| TW-OFDM + Algorithm 2 (independent) | 1.3992 | +0.085% |
| Algorithm 1 + Algorithm 2 (joint) | 1.3996 | +0.114% |
| TW-OFDM + RW-OFDM (joint) | 1.3998 | +0.128% |

Figure 6:
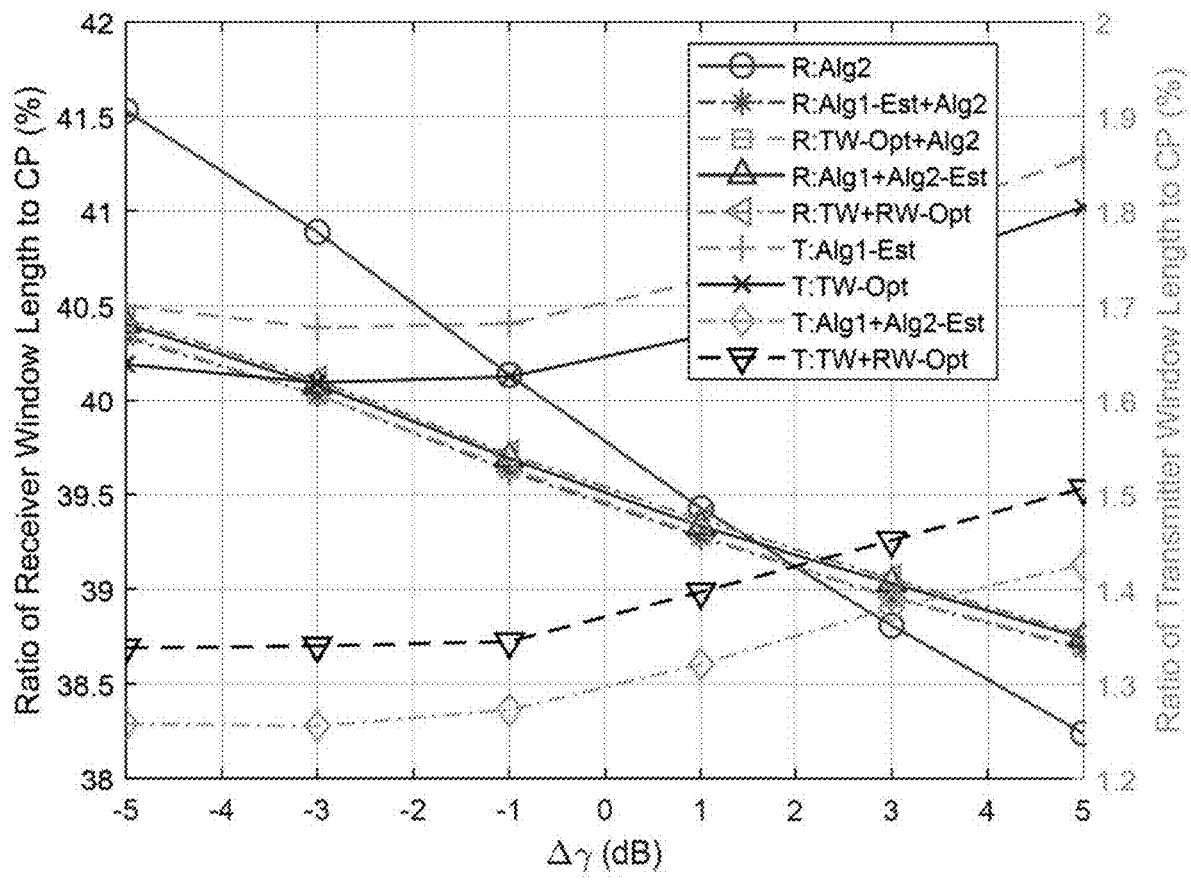
FIG. 6 is a graphical illustration of $\mathbb{E}\{R_u/K_u\}$ and $\mathbb{E}\{T_u/K_u\}$ against the SNR difference between users, in accordance with an embodiment of the present invention.
Figure 7:
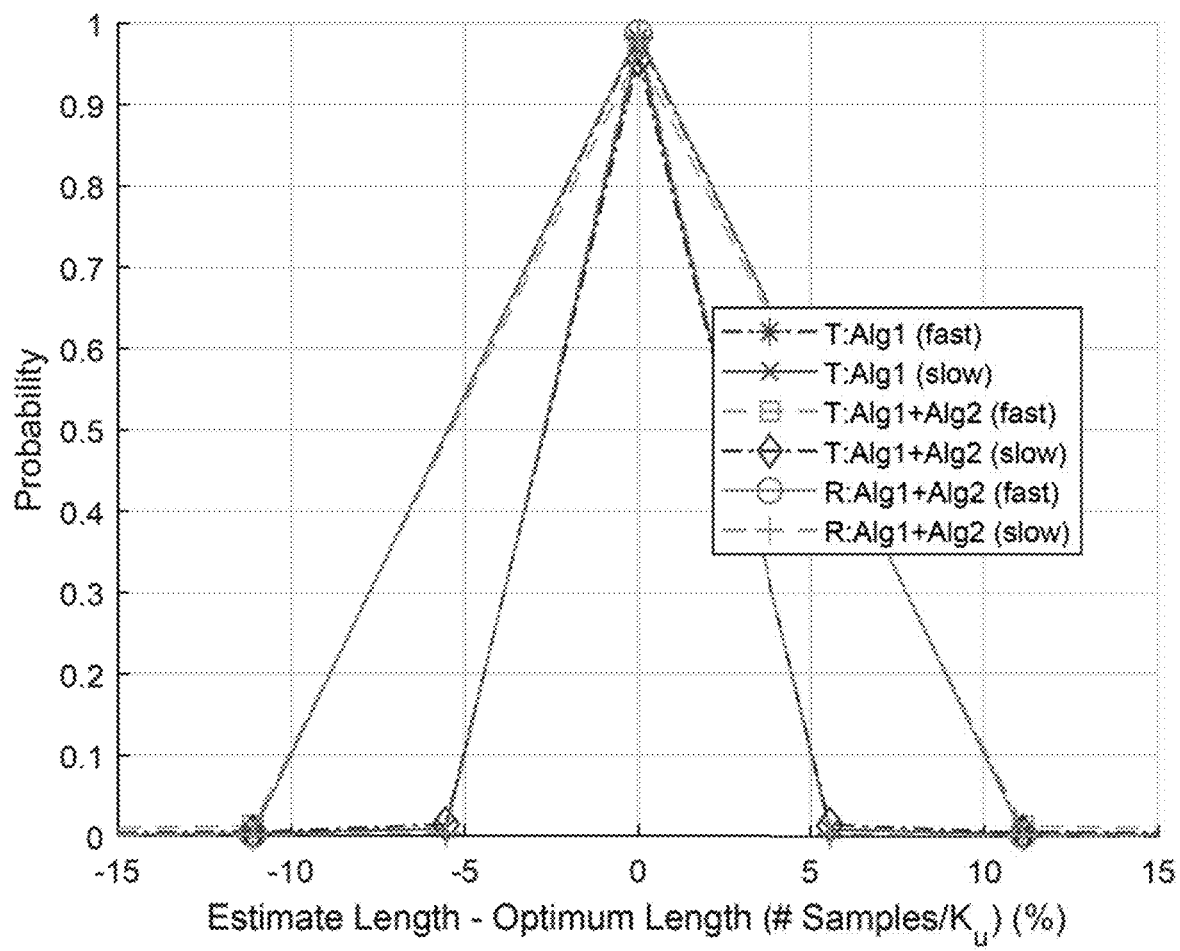
FIG. 7 is a graphical illustration of the probability of the difference between estimated and optimum window lengths being equal to certain percentages of CP, in accordance with an embodiment of the present invention.
Figure 8:
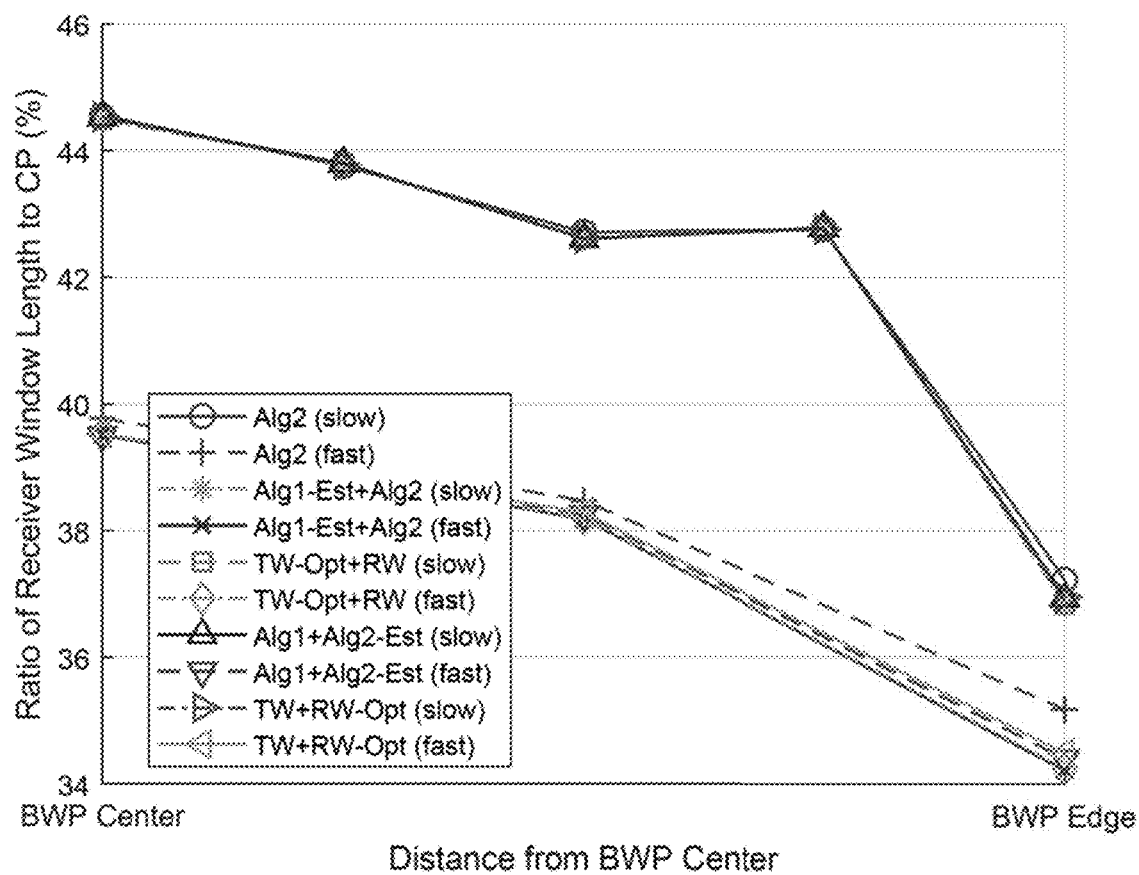
FIG. 8 is a graphical illustration of receiver windowing durations as a function of distance from center of the consumed band, in accordance with an embodiment of the present invention.
Figure 9:
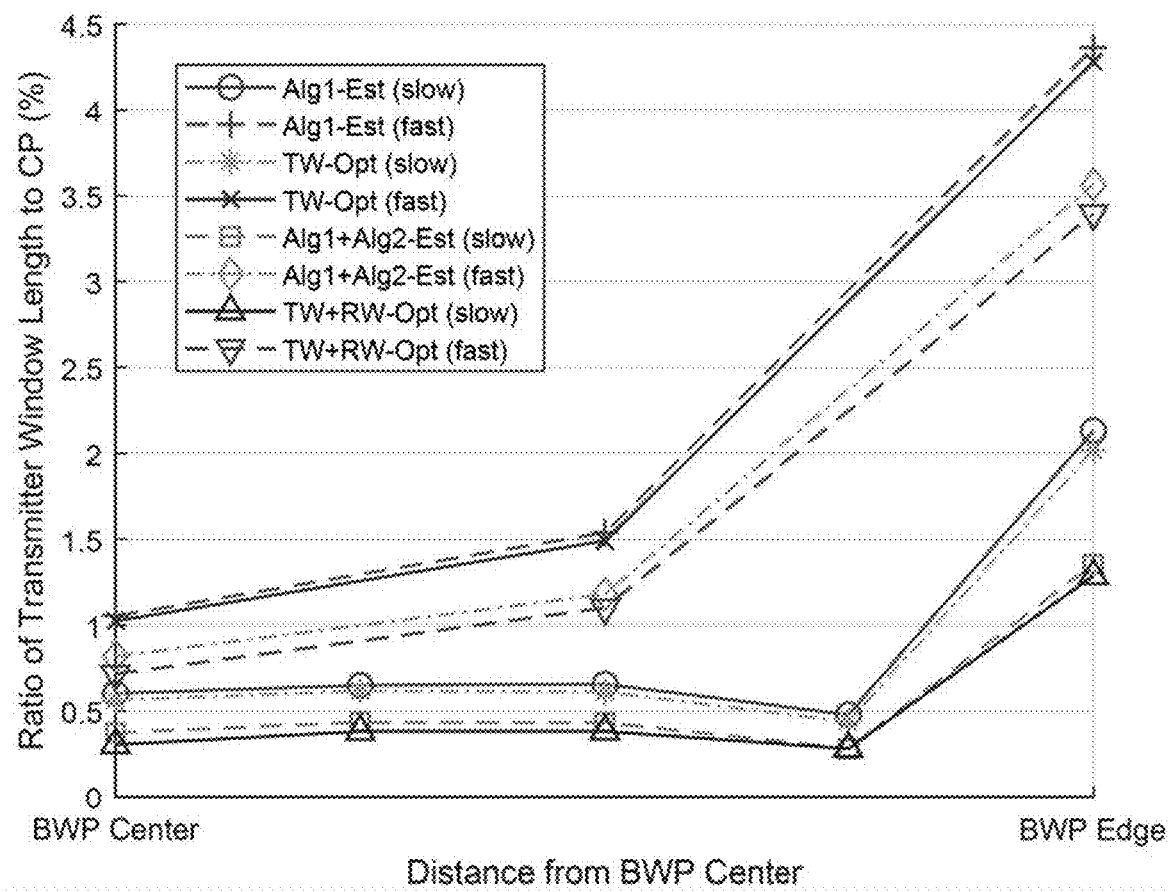
FIG. 9 is a graphical illustration of transmitter windowing durations as a function of distance from the center of the consumed band, in accordance with an embodiment of the present invention.
Figure 10:
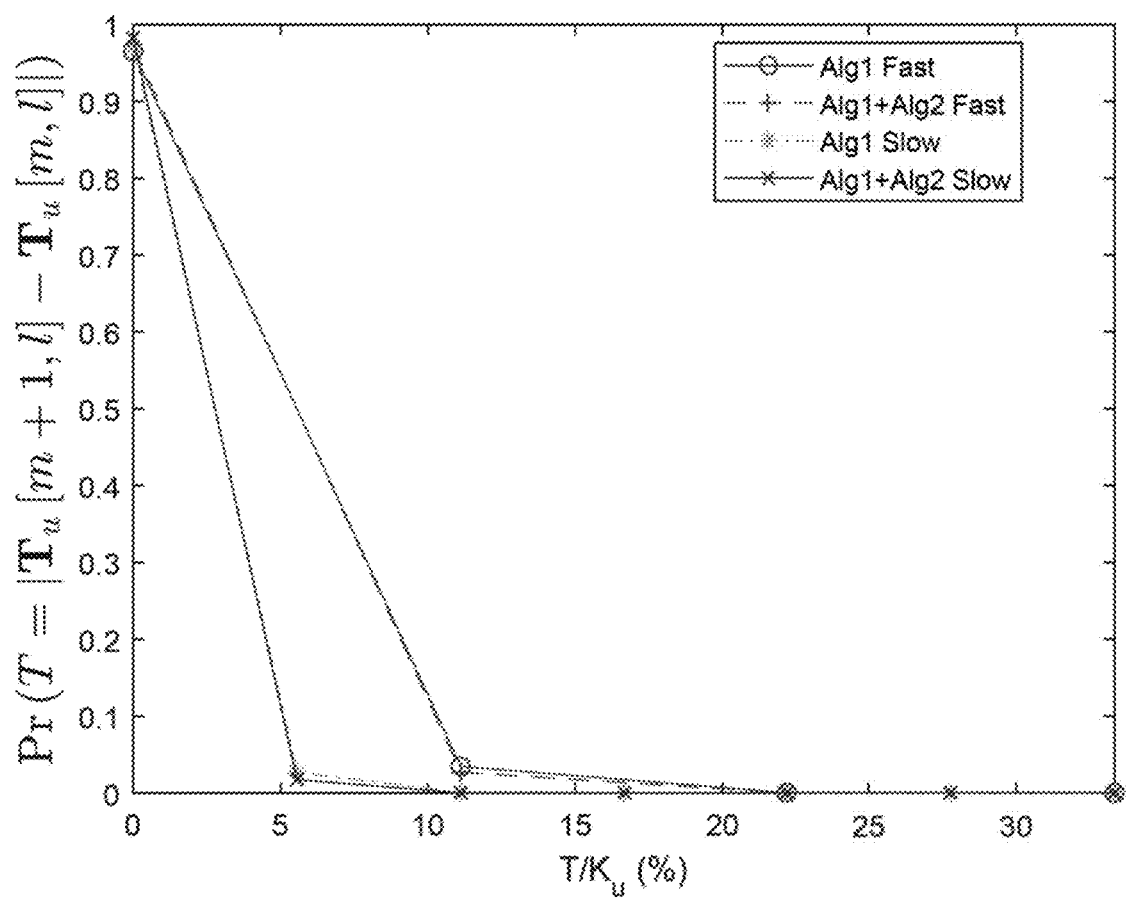
FIG. 10 is a graphical illustration of the probability that transmitter window durations in adjacent subcarriers differ by the given amount, in accordance with an embodiment of the present invention.
Figure 11:
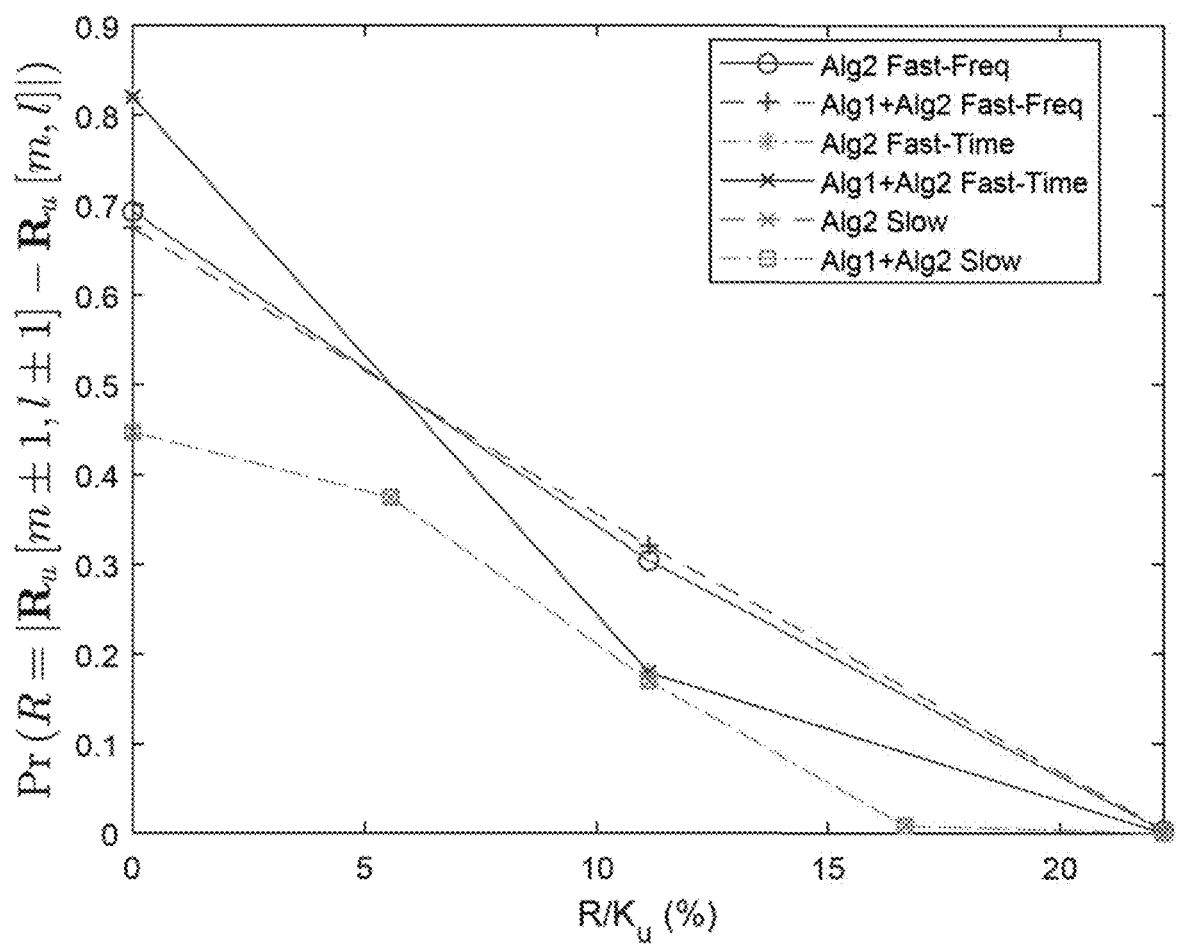
FIG. 11 is a graphical illustration of the probability that receiver window durations in adjacent REs differ by the given amount, in accordance with an embodiment of the present invention.

The interference performance of NC-OFDM at the edge subcarriers also outperforms all cases of Algorithm 1, but Algorithm 1 takes over in the band center subcarriers for high excess SNR. Furthermore, NC-OFDM also requires receiver-side operations, thus has no advantage over F-OFDM. It is seen that while Algorithm 1 has little advantage if the windowing user has no excess SNR, the level of interference decreases further as the window duration is able to increase when the user has excess SNR. Although the proposed algorithm uses the same window design used in ETW-OFDM, the fact that not all REs are windowed prevents the same localization from surfacing. It should also be noted that the gains are a significant function of channel responses of both UEs, and the transmit OOB emission is unable to demonstrate the gains clearly. The fair proportional network throughput, calculated similar to network proportional network capacity using the geometric means of throughput of each user, can be seen in Table II for optimum fixed extension transmitter and receiver windowed OFDM, NC-OFDM, conventional CP-OFDM, adaptive transmitter windowed with estimates obtained using Algorithm 1, adaptive transmitter windowed with optimum durations, F-OFDM, adaptive receiver windowed using durations calculated using Algorithm 2, adaptive transmitter and receiver windowed with transmitter windowing durations calculated using Algorithm 1 without knowing receivers are applying Algorithm 2 followed by Algorithm 2 at the receivers, Algorithm 2 applied to the signals that are adaptive transmitter windowed with optimum durations, adaptive transmitter and receiver windowed with transmitter windowing durations calculated using Algorithm 1 knowing receivers are applying Algorithm 2 followed by Algorithm 2 at the receivers, and adaptive transmitter and receiver windowed with durations optimized jointly. The optimum values were obtained by maximizing the fair proportional network throughput using an evolutionary integer genetic algorithm to find the optimum inputs to Algorithms 1 and/or 2 under actual time-varying channels. It can be seen that although previously proposed extended windowing algorithms improve the BERs, increasing the effective symbol duration by ~18% erases the positive implications on the throughput and reduces it. The artificial noise introduced by the NC-OFDM cannot be resolved at the receivers at these high mobility conditions correctly yielding a decrease in actual throughput. It can be seen that even the featured worst case results of the proposed algorithms increase the throughput and improving algorithm outputs by channel prediction promises further gains closer to optimum. While F-OFDM provides higher throughput compared to Algorithm 1 and adaptive transmitter windowing, it requires that both ends of the communication are aware of the filtering process and apply it. Although knowledge of such improves the throughput, the proposed algorithms do not require the knowledge and action of the counterpart and this is the strength of the proposed method compared to F-OFDM. To show the dependence of window durations on excess SNR, the ratio of estimated and optimum expected window durations to the CP of the corresponding UEs as a function of the SNR difference between the user in interest and the other user are demonstrated in FIG. 6. The results are ordered as follows: Receiver windowing durations of only Algorithm 2, Algorithm 2 applied to the signals transmitted after applying Algorithm 1, Algorithm 2 applied to transmitter windowed samples with the optimum duration if the gNB is unaware that receivers employ Algorithm 2, Algorithm 2 applied to the signals produced Algorithm 1 where gNB knows both receivers also employ Algorithm 2, and Algorithm 2 applied to transmitter windowed samples with the optimum duration calculated knowing that receiver will apply Algorithm 2; as well as transmitter windowing durations estimated by Algorithm 1, optimum adaptive transmitter windowing durations, transmitter windowing duration estimates provided by Algorithm 1 knowing that both receivers also employ Algorithm 2 and optimum transmitter windowing durations calculated if both receivers also employ Algorithm 2. A critical observation is that the transmitter windowing durations, both estimated and actual optimum, increase as the SNR of the user increases, whereas the receiver windowing duration decreases. This proves the basic idea behind fair optimization that the ones with excess SNR must focus on their impact on others whereas the ones with lesser SNR must focus on the impact they receive from others. It can also be seen that the optimum durations for each side get shorter once the resources are jointly used, i.e., the gNB knows that receivers utilize Algorithm 2. FIG. 7 shows the probability of the calculated window duration being a certain amount away from the optimum duration, between Algorithm 1 and optimum transmitter windowing durations, between Algorithm 1 calculated knowing that receivers utilize Algorithm 2 and optimum transmitter window durations obtained when receivers employ Algorithm 2; and receiver windowing durations estimated at the transmitter during calculation of Algorithm 2 and the values obtained at receivers. It can be seen that the guess for both the transmitter and the receiver windowing durations are more accurate for the slower user, proving the dependence on mobility at estimates without channel tracking and prediction. Furthermore, since receiver windowing durations only matter for the RBs in interest as discussed before, receiver windowing durations can be guessed with over 98% probability without making an error. The transmitter windowing estimates have more than 95% probability of being the same as optimum, while overestimating is slightly more probable in the only Algorithm 1 case while underestimating is more probable in the both algorithms utilized case. FIG. 8 and FIG. 9 show the amount of receiver and transmitter windowing applied at the band centers and edges and checks the corresponding validity, where the window durations are labeled similar to that of FIG. 6. It can be seen that the amount of transmitter windowing indeed increases at the band edges, and furthermore it is more important that the faster user with the larger subcarrier spacing and less spectral localization to apply more transmitter windowing. This derives from the fact that the power spectral density (PSD) of signals with larger subcarrier spacing decay slower than those with smaller subcarrier spacing, hence are more crucial for the interference in the system. It can be seen that the receiver windowing durations are higher at the band centers and higher for the user with lower subcarrier spacing. This occurs partly due to the window function design. The window functions are designed to minimize the absorption outside the band of interest, however as the pass-band of the window gets smaller, the reduction performance decreases as well. Since the window pass-bands are smaller on the edge subcarriers, the gain from reduced ACI and ICI reduces whereas the performance reduction due to increased ISI stays the same. This favors longer window durations at the inner subcarriers where increasing window durations result in significant ICI and ACI reduction. The gain from ICI reduction becomes more prominent for the faster user which observes even higher window lengths at inner subcarriers due to the increased ICI. The gain from either type of windowing reduces for both users as windowing at the counterparty is introduced to the systems, both by reduction of forces driving windowing at a given side and also increase in ISI occurring by applying windowing, as both users observe shorter windowing durations on either side that is more uniformly distributed from band centers to edges. Before the average number of performed operations are provided for presented Algorithms in their current forms and compared, spectrotemporal statistics of window durations are provided to demonstrate that there is room for further computational complexity reductions, which are left for future works. Both experienced channel and amount of interference are highly correlated in both dimensions, which in turn create correlated window durations that can reduce complexity load. For example, FIG. 10 shows the probability that window durations calculated for adjacent subcarriers differ by a given duration, as a function of CP length. It is seen that no more than 35% CP duration difference occurred at any time. This suggests that if a subcarrier was calculated to have a long window duration, checking brief window durations for the adjacent subcarriers may be skipped at first and the search can start from a higher value. Furthermore, REs may be grouped and processed together. FIG. 11 presents the same results for Algorithm 2, showing that the differences are even smaller in both time and frequency as the duration is determined using the variance over a group of REs and the RE groups of adjacent RE differ little. It is also worth noting that window durations in adjacent REs of the faster user are more likely to differ by longer durations than that of the slower user, which depends on both increased subcarrier spacing and channel variations. Finally, the computational load of the algorithms in their presented forms is analyzed and compared with F-OFDM. The filter lengths are $N_u/2+1$, and since filters consist of complex values, the computational complexity of F-OFDM is $(N_u+K_u)L_u(3N_u/2+2)$ real additions and $(N_u+K_u)L_u(2N_u+4)$ real multiplications at the UE, and these values summed over all users at the gNB. The computational complexities of the presented algorithms depend on the window duration and side of each RE, of which values have the probability distributions shown in FIG. 12. Accordingly, the gNB and UE side computational complexities of the algorithms are presented in Table III.

TABLE III

COMPUTATIONAL COMPLEXITIES OF F-OFDM AND ALGORITHMS 1 AND 2

| Algorithm | gNB add | gNB mult | UE add | UE mult |
|---|---|---|---|---|
| F-OFDM | 1907040 | 2551488 | 637872 + 1269168 | 854880 + 1696608 |
| Alg. 1 | 5342353 | 5332295 | 0 | 0 |
| Alg. 2 | 0 | 0 | 2088692 + 4166143 | 1054709 + 2236623 |

Figure 12:
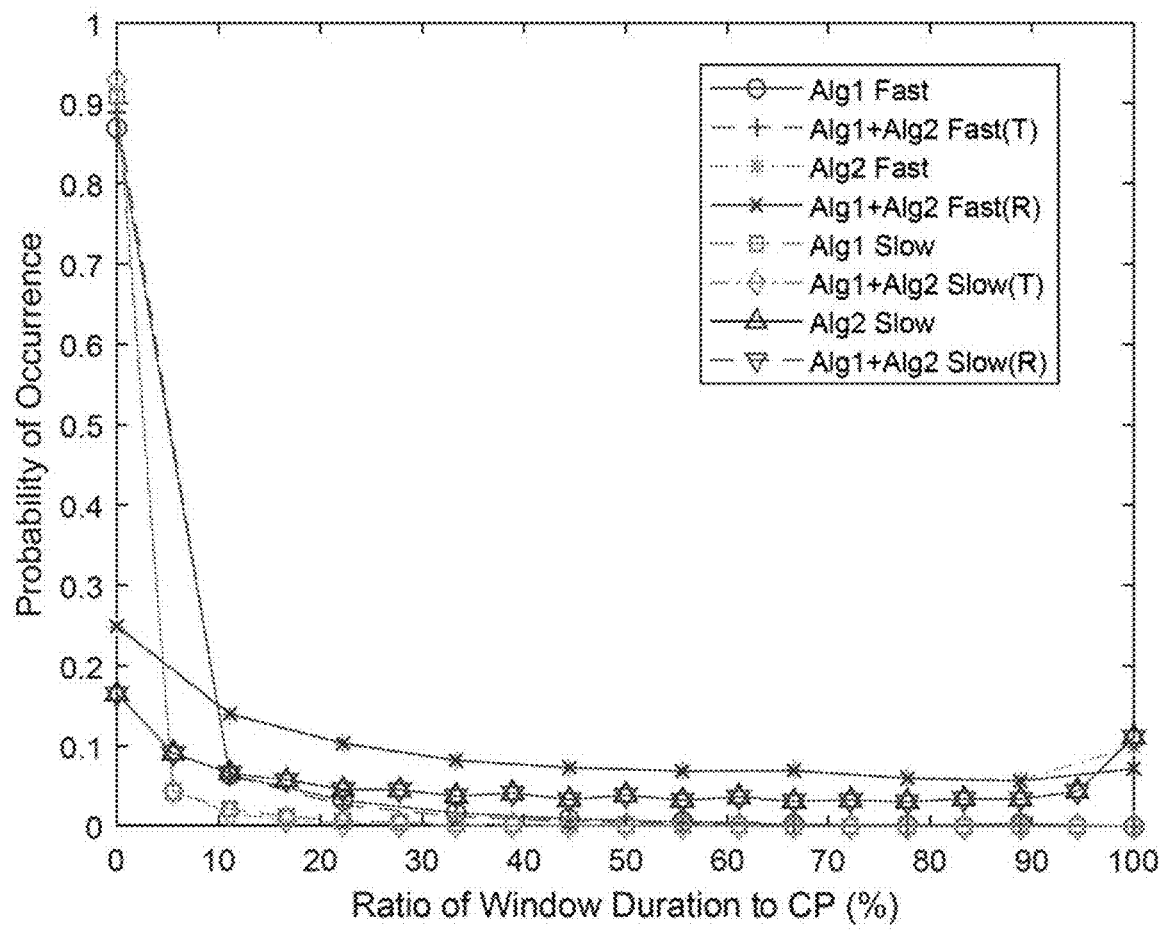
FIG. 12 is a graphical illustration of the probability of transmitter (T) and receiver (R) window durations according in a test scenarios, in accordance with an embodiment of the present invention.

As Algorithm 1 only runs at the gNB and Algorithm 2 only runs at the UE without any operation requirements at the counterpart, the counterpart complexities are 0 for both users. It is seen that while the gNB side complexity for Algorithm 1 is higher than that of F-OFDM, assuming that gNBs are not computationally bounded, the transparency of Algorithm 1 still makes it a possible candidate under heavy traffic. The computational complexity of Algorithm 2 is similar to that of F-OFDM if the further computational complexity reduction tricks described in the preceding paragraph are not employed, and Algorithm 2 is also transparent to the transmitter. Another interesting observation that can be made from FIG. 12 is that for Algorithm 2, under severe ACI conditions, longer window durations may be beneficial, however since the window duration is limited by CP length, all those results manifest themselves at the upper bound, creating a high probability peak at the longest duration. Computational complexity can be further reduced if Algorithm 2 is modified to check the longest possibility before others, however these highly implementation specific details are left for future work.

In various embodiments, the present invention has demonstrated the concept of frame structure compliant computationally efficient adaptive per-RE extensionless transmitter windowing to maximize fair proportional beyond 5G network capacity in the DL, and universal per-RE receiver windowing that requires no additional knowledge. Results demonstrate that gains are possible from windowing without introducing extra extensions that defy the frame structure if the side, RE and duration to apply windowing is calculated carefully. The user with higher excess SNR must apply longer transmitter windowing as they can resist the SNR reduction, whereas the user with lower excess SNR must apply longer receiver windowing. Users with higher subcarrier spacing and higher mobility cause more interference in the system hence should apply more transmitter windowing, whereas users with lower subcarrier spacing must focus on receiver windowing. Optimum transmitter window durations are longer at the edges whereas optimum receiver window durations are longer at band centers. Emulating the multipath multiple access channel allows the gNB to estimate optimum transmitter windowing durations prior to transmission with 95% confidence. Using the variance of received symbols allows the UEs to calculate optimal receiver windowing durations without calculations requiring further knowledge about the network and channel. While both algorithms are presented for per-RE calculations, spectrotemporal correlation of window durations allow reduced computational complexity implementations than those described. Extensionless windowing at either side does not require action and information transfer to the communication counterpart and is fully compatible with previous and current generations, however the knowledge of adaptive windowing applied at the counterpart allows joint optimization that reveals higher gains.

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An adaptive windowing method for a cellular communication network, the method comprising:
   determining a receiver windowing duration for receiving a plurality of subcarriers of an Orthogonal Frequency Division Multiplexed (OFDM) symbol at a receiver of each of a plurality of user equipment nodes of a cellular communication network, wherein the receiver windowing duration is determined based upon variance of received symbols using different window durations; and
   determining a transmitter windowing duration for downloading each of the subcarriers of the OFDM symbol to each of the plurality of user equipment nodes from a base station transmitter of the cellular communication network, wherein the transmitter windowing duration for each of the subcarriers is determined based upon a signal to interference plus noise ratio (SINR) of each of the plurality of user equipment nodes.

2. The method of claim 1, wherein the determining the receiver windowing duration and the transmitter windowing duration maximizes the fair proportion network capacity of the cellular communication network when downloading the subcarriers.

3. The method of claim 1, wherein determining the receiver windowing duration and determining the transmitter windowing duration do not add any additional extensions other than the cyclic prefix used in a standard frame structure of the subcarriers of the subcarriers.

4. The method of claim 1, wherein the receiver windowing duration for user equipment nodes with lower excess SINR is longer than the receiver windowing duration for user equipment nodes with higher excess SINR.

5. The method of claim 1, wherein the transmitter windowing duration for user equipment nodes with higher excess SINR is longer than the transmitter windowing duration for user equipment nodes with lower excess SINR.

6. The method of claim 1, wherein the receiver windowing duration for user equipment nodes with lower subcarrier spacing is longer than the receiver windowing duration for user equipment nodes with higher subcarrier spacing.

7. The method of claim 1, wherein the transmitter windowing duration for user equipment nodes with higher subcarrier spacing is longer that the transmitter windowing duration for user equipment nodes with lower subcarrier spacing.

8. The method of claim 1, wherein spacing of the subcarriers of the OFDM symbol are based upon the mobility of the user equipment nodes.

9. A system for adaptive windowing method in cellular communication networks, the system comprising:
- a plurality of user equipment nodes operating in a cellular communication network, each of the plurality of user equipment nodes for;
    determining a receiver windowing duration for receiving a plurality of subcarriers of an Orthogonal Frequency Division Multiplexed (OFDM) symbol at a receiver of the user equipment node, wherein the receiver windowing duration is determined based upon variance of received symbols using different window durations; and
- a base station transmitter coupled to the plurality of plurality of user equipment nodes, the base station transmitter configured for;
    determining a transmitter windowing duration for downloading each of the subcarriers of the OFDM symbol to each of the plurality of user equipment nodes from the base station transmitter of the cellular communication network, wherein the transmitter windowing duration for each of the subcarriers is determined based upon a signal to interference plus noise ratio (SINR) of each of the plurality of user equipment nodes.

10. The system of claim 9, wherein the determining the receiver windowing duration and the transmitter windowing duration maximizes the fair proportion network capacity of the cellular communication network when downloading the subcarriers.

11. The system of claim 9, wherein determining the receiver windowing duration and determining the transmitter windowing duration do not add any additional extensions other than the cyclic prefix used in a standard frame structure of the subcarriers of the subcarriers.

12. The system of claim 9, wherein the receiver windowing duration for user equipment nodes with lower excess SINR is longer than the receiver windowing duration for user equipment nodes with higher excess SINR.

13. The system of claim 9, wherein the transmitter windowing duration for user equipment nodes with higher excess SINR is longer than the transmitter windowing duration for user equipment nodes with lower excess SINR.

14. The system of claim 9, wherein the receiver windowing duration for user equipment nodes with lower subcarrier spacing is longer than the receiver windowing duration for user equipment nodes with higher subcarrier spacing.

15. The system of claim 9, wherein the transmitter windowing duration for user equipment nodes with higher subcarrier spacing is longer that the transmitter windowing duration for user equipment nodes with lower subcarrier spacing.

16. The system of claim 9, wherein spacing of the subcarriers of the OFDM symbol are based upon the mobility of the user equipment nodes.

17. One or more non-transitory computer-readable media having computer-executable instructions for performing a method of running a software program on a computing device, the computing device operating under an operating system, the method including issuing instructions from the software program comprising:
- determining a receiver windowing duration for receiving a plurality of subcarriers of an Orthogonal Frequency Division Multiplexed (OFDM) symbol at a receiver of each of a plurality of user equipment nodes of a cellular communication network, wherein the receiver windowing duration is determined based upon variance of received symbols using different window durations; and
- determining a transmitter windowing duration for downloading each of the subcarriers of the OFDM symbol to each of the plurality of user equipment nodes from a base station transmitter of the cellular communication network, wherein the transmitter windowing duration for each of the subcarriers is determined based upon a signal to interference plus noise ratio (SINR) of each of the plurality of user equipment nodes.

18. The media of claim 17, wherein the determining the receiver windowing duration and the transmitter windowing duration maximizes the fair proportion network capacity of the cellular communication network when downloading the subcarriers.

19. The media of claim 17, wherein determining the receiver windowing duration and determining the transmitter windowing duration do not add any additional extensions other than the cyclic prefix used in a standard frame structure of the subcarriers of the subcarriers.

20. The media of claim 17, wherein spacing of the subcarriers of the OFDM symbol are based upon the mobility of the user equipment node.

* * * * *